United States Patent
Usher et al.

(10) Patent No.: US 11,750,965 B2
(45) Date of Patent: *Sep. 5, 2023

(54) ACOUSTIC DAMPENING COMPENSATION SYSTEM

(71) Applicant: Staton Techiya, LLC

(72) Inventors: John Usher, Beer (GB); Steve Goldstein, Delray Beach, FL (US); John P. Keady, Delray Beach, FL (US)

(73) Assignee: Staton Techiya, LLC, Delray Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/353,810

(22) Filed: Jun. 22, 2021

(65) Prior Publication Data

US 2021/0345034 A1    Nov. 4, 2021

Related U.S. Application Data

(63) Continuation-in-part of application No. 16/662,505, filed on Oct. 24, 2019, now Pat. No. 11,277,682,
(Continued)

(51) Int. Cl.
*H04R 1/10*    (2006.01)
*G01H 3/00*    (2006.01)

(52) U.S. Cl.
CPC ............. *H04R 1/1083* (2013.01); *G01H 3/00* (2013.01)

(58) Field of Classification Search
CPC .... H04R 5/033; G10L 15/00; G06K 9/00335; H03G 3/32; H04S 7/304
(Continued)

(56) References Cited

U.S. PATENT DOCUMENTS 3,876,843 A    4/1975    Moen
4,054,749 A    10/1977    Suzuki et al.
(Continued)

FOREIGN PATENT DOCUMENTS

EP    1385324    1/2004
EP    1401240    3/2004
(Continued)

OTHER PUBLICATIONS

Olwal, A. and Feiner S. Interaction Techniques Using Prosodic Features of Speech and Audio Localization. Proceedings of IUI 2005 (International Conference on Intelligent User Interfaces), San Diego, CA, Jan. 9-12, 2005, p. 284-286.
(Continued)

*Primary Examiner* — Alexander Krzystan
(74) *Attorney, Agent, or Firm* — Akerman LLP; Peter A. Chiabotti

(57) ABSTRACT

At least one exemplary embodiment is directed to a communication device that includes a microphone configured to detect an acoustic signal from an acoustic environment, and a processor, configured to detect an acoustical dampening between the acoustic environment and the microphone, based on a change in a characteristic of the acoustic signal and, responsive to the acoustical dampening, apply a compensation filter to the acoustic signal to form a compensated acoustic signal that is reproduced. Other embodiments are disclosed.

30 Claims, 17 Drawing Sheets

Related U.S. Application Data which is a continuation of application No. 16/179,171, filed on Nov. 2, 2018, now Pat. No. 10,506,329, which is a continuation of application No. 14/109,987, filed on Dec. 18, 2013, now Pat. No. 10,123,110, which is a continuation of application No. 12/044,727, filed on Mar. 7, 2008, now Pat. No. 8,625,812.

(60) Provisional application No. 60/893,617, filed on Mar. 7, 2007.

(58) Field of Classification Search
USPC ...... 381/56, 71.1, 71.2, 71.3, 71.4, 71.5, 72, 381/74, 60; 704/231
See application file for complete search history.

(56) References Cited

U.S. PATENT DOCUMENTS

| | | | |
|---|---|---|---|
| 4,088,849 A | 5/1978 | Usami et al. |
| 4,947,440 A | 8/1990 | Bateman et al. |
| 5,208,867 A | 5/1993 | Stites, III |
| 5,267,321 A | 11/1993 | Langberg |
| 5,276,740 A | 1/1994 | Inanaga et al. |
| 5,317,273 A | 5/1994 | Hanson |
| 5,327,506 A | 7/1994 | Stites |
| 5,524,056 A | 6/1996 | Killion et al. |
| 5,577,511 A | 11/1996 | Killion |
| 5,668,883 A * | 9/1997 | Abe | H04R 3/02 381/74 |
| 5,903,868 A | 5/1999 | Yuen et al. |
| 5,923,624 A | 7/1999 | Groeger |
| 5,933,510 A | 8/1999 | Bryant |
| 5,946,050 A | 8/1999 | Wolff |
| 6,005,525 A | 12/1999 | Kivela |
| 6,021,207 A | 2/2000 | Puthuff et al. |
| 6,021,325 A | 2/2000 | Hall |
| 6,028,514 A | 2/2000 | Lemelson |
| 6,056,698 A | 5/2000 | Iseberg |
| 6,118,877 A | 9/2000 | Lindemann |
| 6,163,338 A | 12/2000 | Johnson et al. |
| 6,163,508 A | 12/2000 | Kim et al. |
| 6,226,389 B1 | 5/2001 | Lemelson et al. |
| 6,298,323 B1 | 10/2001 | Kaemmerer |
| 6,359,993 B2 | 3/2002 | Brimhall |
| 6,400,652 B1 | 6/2002 | Goldberg et al. |
| 6,408,272 B1 | 6/2002 | White |
| 6,415,034 B1 | 7/2002 | Hietanen |
| 6,567,524 B1 | 5/2003 | Svean et al. |
| 6,606,598 B1 | 8/2003 | Holthouse |
| 6,639,987 B2 | 10/2003 | McIntosh |
| RE38,351 E | 12/2003 | Iseberg et al. |
| 6,661,901 B1 | 12/2003 | Svean et al. |
| 6,728,385 B2 | 4/2004 | Kvaloy et al. |
| 6,748,238 B1 | 6/2004 | Lau |
| 6,754,359 B1 | 6/2004 | Svean et al. |
| 6,804,638 B2 | 10/2004 | Fiedler |
| 6,804,643 B1 | 10/2004 | Kiss |
| 7,039,195 B1 | 5/2006 | Svean |
| 7,039,585 B2 | 5/2006 | Wilmot |
| 7,050,592 B1 | 5/2006 | Iseberg |
| 7,072,482 B2 | 7/2006 | Van Doorn et al. |
| 7,107,109 B1 | 9/2006 | Nathan et al. |
| 7,158,933 B2 | 1/2007 | Balan |
| 7,177,433 B2 | 2/2007 | Sibbald |
| 7,209,569 B2 | 4/2007 | Boesen |
| 7,280,849 B1 | 10/2007 | Bailey |
| 7,430,299 B2 | 9/2008 | Armstrong et al. |
| 7,433,714 B2 | 10/2008 | Howard et al. |
| 7,450,730 B2 | 11/2008 | Bertg et al. |
| 7,464,029 B2 | 12/2008 | Visser |
| 7,477,756 B2 | 1/2009 | Wickstrom et al. |
| 7,562,020 B2 | 6/2009 | Le et al. |
| 7,574,917 B2 | 8/2009 | Von Dach |
| 7,756,285 B2 | 7/2010 | Sjursen et al. |
| 7,778,434 B2 | 8/2010 | Juneau et al. |
| 7,903,825 B1 | 3/2011 | Melanson |
| 7,903,826 B2 | 3/2011 | Boersma |
| 7,920,557 B2 | 4/2011 | Moote |
| 7,983,907 B2 | 7/2011 | Visser |
| 8,014,553 B2 | 9/2011 | Radivojevic et al. |
| 8,045,840 B2 | 10/2011 | Murata et al. |
| 8,086,093 B2 | 12/2011 | Stuckman |
| 8,140,325 B2 | 3/2012 | Kanevsky |
| 8,150,044 B2 | 4/2012 | Goldstein |
| 8,160,261 B2 | 4/2012 | Schulein |
| 8,160,273 B2 | 4/2012 | Visser |
| 8,162,846 B2 | 4/2012 | Epley |
| 8,184,823 B2 | 5/2012 | Itabashi |
| 8,218,784 B2 | 7/2012 | Schulein |
| 8,254,591 B2 | 8/2012 | Goldstein |
| 8,401,200 B2 | 3/2013 | Tiscareno |
| 8,493,204 B2 | 7/2013 | Wong et al. |
| 8,577,062 B2 | 11/2013 | Goldstein |
| 8,611,560 B2 | 12/2013 | Goldstein |
| 8,625,818 B2 | 1/2014 | Stultz |
| 8,718,305 B2 | 5/2014 | Usher |
| 8,750,295 B2 | 6/2014 | Liron |
| 8,774,433 B2 | 7/2014 | Goldstein |
| 8,798,278 B2 | 8/2014 | Isabelle |
| 8,855,343 B2 | 10/2014 | Usher |
| 8,917,894 B2 | 12/2014 | Goldstein |
| 8,983,081 B2 | 3/2015 | Bayley |
| 9,037,458 B2 | 5/2015 | Park et al. |
| 9,053,697 B2 | 6/2015 | Park |
| 9,123,343 B2 | 9/2015 | Kurki-Suonio |
| 9,135,797 B2 | 9/2015 | Couper et al. |
| 9,191,740 B2 | 11/2015 | McIntosh |
| 9,196,247 B2 | 11/2015 | Harada |
| 9,491,542 B2 | 11/2016 | Usher |
| 9,560,451 B2 | 1/2017 | Eichfeld |
| 9,620,142 B2 | 4/2017 | Keller |
| 9,628,896 B2 | 4/2017 | Ichimura |
| 9,681,246 B2 | 6/2017 | Horbach |
| 10,379,386 B2 | 8/2019 | Fan |
| 2001/0046304 A1 | 11/2001 | Rast |
| 2002/0076057 A1 | 6/2002 | Voix |
| 2002/0098878 A1 | 7/2002 | Mooney |
| 2002/0106091 A1 | 8/2002 | Furst et al. |
| 2002/0111798 A1 | 8/2002 | Huang |
| 2002/0118798 A1 | 8/2002 | Langhart et al. |
| 2002/0165719 A1 | 11/2002 | Wang |
| 2003/0130016 A1 | 7/2003 | Matsuura |
| 2003/0152359 A1 | 8/2003 | Kim |
| 2003/0161097 A1 | 8/2003 | Le et al. |
| 2003/0165246 A1 | 9/2003 | Kvaloy et al. |
| 2003/0165319 A1 | 9/2003 | Barber |
| 2003/0198359 A1 | 10/2003 | Killion |
| 2004/0042103 A1 | 3/2004 | Mayer |
| 2004/0086138 A1 | 5/2004 | Kuth |
| 2004/0109668 A1 | 6/2004 | Stuckman |
| 2004/0109579 A1 | 7/2004 | Izuchi |
| 2004/0125965 A1 | 7/2004 | Alberth, Jr. et al. |
| 2004/0190737 A1 | 9/2004 | Kuhnel et al. |
| 2004/0196992 A1 | 10/2004 | Ryan |
| 2004/0202339 A1 * | 10/2004 | O'Brien, Jr. | H04R 25/606 379/430 |
| 2004/0203351 A1 | 10/2004 | Shearer et al. |
| 2004/0264938 A1 | 12/2004 | Felder |
| 2005/0028212 A1 | 2/2005 | Laronne |
| 2005/0058313 A1 | 3/2005 | Victorian |
| 2005/0068171 A1 | 3/2005 | Kelliher |
| 2005/0078838 A1 | 4/2005 | Simon |
| 2005/0123146 A1 | 6/2005 | Voix et al. |
| 2005/0207605 A1 | 9/2005 | Dehe |
| 2005/0281423 A1 | 12/2005 | Armstrong |
| 2005/0288057 A1 | 12/2005 | Lai et al. |
| 2006/0045294 A1 * | 3/2006 | Smyth | H04S 7/304 381/74 |
| 2006/0067551 A1 | 3/2006 | Cartwright et al. |
| 2006/0083390 A1 | 4/2006 | Kaderavek |
| 2006/0083395 A1 | 4/2006 | Allen et al. |
| 2006/0092043 A1 | 5/2006 | Lagassey |
| 2006/0140425 A1 | 6/2006 | Berg |
| 2006/0167687 A1 | 7/2006 | Kates |

(56) References Cited

U.S. PATENT DOCUMENTS

| | | |
|---|---|---|
| 2006/0173563 A1 | 8/2006 | Borovitski |
| 2006/0182287 A1 | 8/2006 | Schulein |
| 2006/0188075 A1 | 8/2006 | Peterson |
| 2006/0188105 A1 | 8/2006 | Baskerville |
| 2006/0195322 A1 | 8/2006 | Broussard et al. |
| 2006/0204014 A1 | 9/2006 | Isenberg et al. |
| 2006/0264176 A1 | 11/2006 | Hong |
| 2006/0287014 A1 | 12/2006 | Matsuura |
| 2007/0003090 A1 | 1/2007 | Anderson |
| 2007/0021958 A1 | 1/2007 | Visser et al. |
| 2007/0036377 A1 | 2/2007 | Stirnemann |
| 2007/0043563 A1 | 2/2007 | Comerford et al. |
| 2007/0086600 A1 | 4/2007 | Boesen |
| 2007/0143820 A1 | 6/2007 | Pawlowski |
| 2007/0189544 A1 | 8/2007 | Rosenberg |
| 2007/0255435 A1 | 11/2007 | Cohen |
| 2007/0291953 A1 | 12/2007 | Ngia et al. |
| 2008/0037801 A1 | 2/2008 | Alves et al. |
| 2008/0137873 A1 | 6/2008 | Goldstein |
| 2008/0144868 A1* | 6/2008 | Stirnemann .......... H04R 25/453 381/317 |
| 2008/0145032 A1 | 6/2008 | Lindroos |
| 2008/0165988 A1 | 7/2008 | Terlizzi et al. |
| 2008/0226113 A1* | 9/2008 | Kuhtz .................. H04R 1/1016 381/375 |
| 2009/0010456 A1 | 1/2009 | Goldstein et al. |
| 2009/0024234 A1 | 1/2009 | Archibald |
| 2009/0076821 A1 | 3/2009 | Brenner |
| 2009/0103745 A1* | 4/2009 | Grell .................... H04R 1/1083 381/72 |
| 2009/0122996 A1 | 5/2009 | Klein |
| 2009/0286515 A1 | 5/2009 | Othmer |
| 2009/0209304 A1* | 8/2009 | Ngia .................... H04R 1/1091 455/575.2 |
| 2010/0061564 A1 | 3/2010 | Clemow et al. |
| 2010/0119077 A1 | 5/2010 | Platz |
| 2010/0296668 A1 | 11/2010 | Lee et al. |
| 2011/0055256 A1 | 3/2011 | Phillips |
| 2011/0096939 A1 | 4/2011 | Ichimura |
| 2011/0116643 A1 | 5/2011 | Tiscareno |
| 2011/0264447 A1 | 10/2011 | Visser et al. |
| 2011/0293103 A1 | 12/2011 | Park et al. |
| 2014/0023203 A1 | 1/2014 | Rotschild |
| 2014/0122092 A1 | 5/2014 | Goldstein |
| 2014/0163976 A1 | 6/2014 | Park |
| 2015/0215701 A1 | 7/2015 | Usher |
| 2016/0104452 A1 | 4/2016 | Guan et al. |

FOREIGN PATENT DOCUMENTS

| | | |
|---|---|---|
| EP | 1519625 A2 | 3/2005 |
| EP | 1640972 | 3/2006 |
| JP | H0877468 | 3/1996 |
| JP | H10162283 | 6/1998 |
| KR | 20120042218 | 5/2012 |
| WO | 2004114722 | 12/2004 |
| WO | 2006037156 A1 | 4/2006 |
| WO | 2006054698 | 5/2006 |
| WO | 2007092660 | 8/2007 |
| WO | 2008050583 | 5/2008 |
| WO | 2009023784 | 2/2009 |
| WO | 2012097150 | 7/2012 |

OTHER PUBLICATIONS

Bernard Widrow, John R. Glover Jr., John M. McCool, John Kaunitz, Charles S. Williams, Robert H. Hearn, James R. Zeidler, Eugene Dong Jr, and Robert C. Goodlin, Adaptive Noise Cancelling: Principles and Applications, Proceedings of the IEEE, vol. 63, No. 12, Dec. 1975.

Mauro Dentino, John M. McCool, and Bernard Widrow, Adaptive Filtering in the Frequency Domain, Proceedings of the IEEE, vol. 66, No. 12, Dec. 1978.

Bernard Widrow, John R. Glover Jr., John M. McCool, John Kaunitz, Charles S. Williams, Robert H. Hearn, James R. Zeidler, Eugene Dong Jr, and Robert C. Goodlin, Adaptive Noise Cancelling: Principles and Applications, Proceedings of the IEEE, vol. 63, No. 12, Dec. 1975.

*Samsung Electronics Co., Ltd., and Samsung Electronics, America, Inc.*, v. *Staton Techiya, LLC*, IPR2022-00282, Dec. 21, 2021.
*Samsung Electronics Co., Ltd., and Samsung Electronics, America, Inc.*, v. *Staton Techiya, LLC*, IPR2022-00242, Dec. 23, 2021.
*Samsung Electronics Co., Ltd., and Samsung Electronics, America, Inc.*, v. *Staton Techiya, LLC*, IPR2022-00243, Dec. 23, 2021.
*Samsung Electronics Co., Ltd., and Samsung Electronics, America, Inc.*, v. *Staton Techiya, LLC*, IPR2022-00234, Dec. 21, 2021.
*Samsung Electronics Co., Ltd., and Samsung Electronics, America, Inc.*, v. *Staton Techiya, LLC*, IPR2022-00253, Jan. 18, 2022.
*Samsung Electronics Co., Ltd., and Samsung Electronics, America, Inc.*, v. *Staton Techiya, LLC*, IPR2022-00324, Jan. 13, 2022.
*Samsung Electronics Co., Ltd., and Samsung Electronics, America, Inc.*, v. *Staton Techiya, LLC*, IPR2022-00281, Jan. 18, 2022.
*Samsung Electronics Co., Ltd., and Samsung Electronics, America, Inc.*, v. *Staton Techiya, LLC*, IPR2022-00302, Jan. 13, 2022.
*Samsung Electronics Co., Ltd., and Samsung Electronics, America, Inc.*, v. *Staton Techiya, LLC*, IPR2022-00369, Feb. 18, 2022.
*Samsung Electronics Co., Ltd., and Samsung Electronics, America, Inc.*, v. *Staton Techiya, LLC*, IPR2022-00388, Feb. 18, 2022.
*Samsung Electronics Co., Ltd., and Samsung Electronics, America, Inc.*, v. *Staton Techiya, LLC*, IPR2022-00410, Feb. 18, 2022.

\* cited by examiner

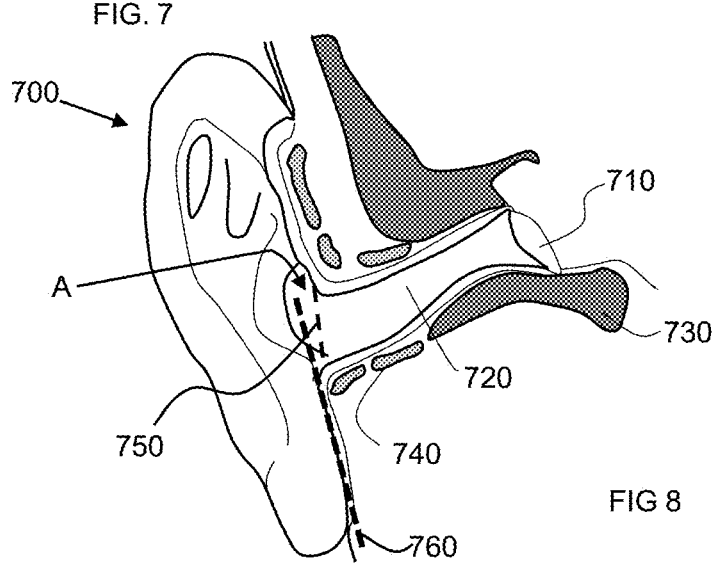
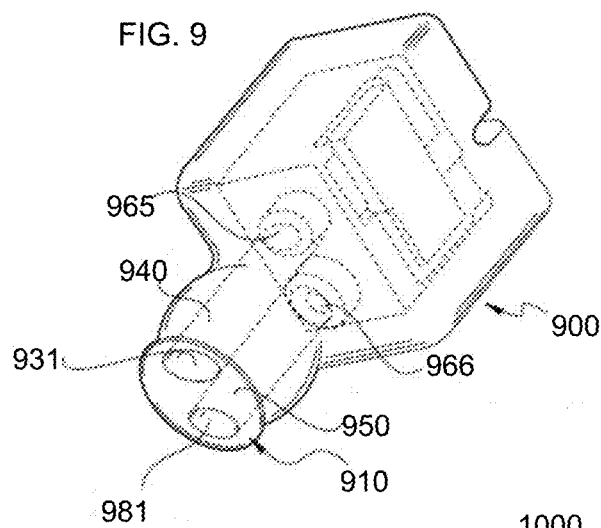
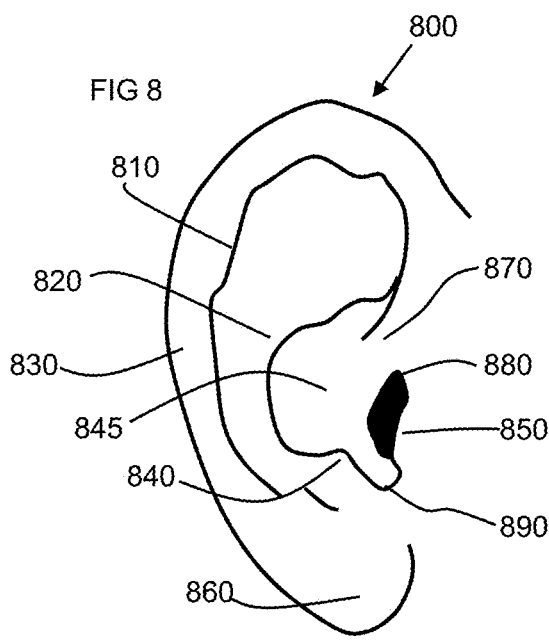
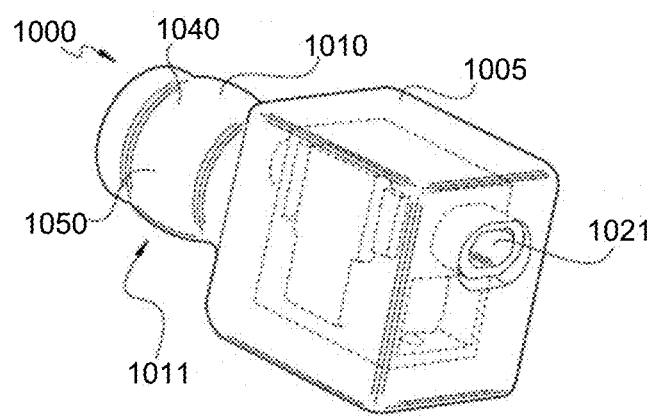

ACOUSTIC DAMPENING COMPENSATION SYSTEM

CROSS-REFERENCE TO RELATED APPLICATIONS

This application is a continuation in part of U.S. patent application Ser. No. 16/662,505, filed on 24 Oct. 2019, which is a continuation of U.S. patent application Ser. No. 16/179,171, filed on Nov. 2, 2018, which is an application that is a continuation of and claims priority to U.S. patent application Ser. No. 14/109,987, filed on Dec. 18, 2013, now U.S. Pat. No. 10,123,110, which is a continuation of and claims priority to U.S. patent application Ser. No. 12/044,727, filed on Mar. 7, 2008, now U.S. Pat. No. 8,625,812, which claims priority to and the benefit of Provisional Application No. 60/893,617, filed on Mar. 7, 2007, all of which are hereby incorporated by reference in their entireties.

FIELD OF THE INVENTION

The present invention relates to acoustic signal manipulation, and more particularly, though not exclusively, to the acoustic compensation of acoustic dampening by headwear on detected acoustic signals.

BACKGROUND OF THE INVENTION

Some acoustic detecting and/or measuring devices (e.g., earpieces, room microphones), that measure ambient acoustic signals can be adversely affected when an acoustic dampening occurs between the source of an acoustic signal in an environment and the detecting and/or measuring device. The effect can be frequency dependent and can adversely effect the quality (e.g., spectral characteristics) of the measured acoustic signal.

SUMMARY OF THE INVENTION

In a first embodiment, a communication device includes a microphone configured to detect an acoustic signal from an acoustic environment, and a processor, configured to detect an acoustical dampening between the acoustic environment and the microphone, based on a change in a characteristic of the acoustic signal and, responsive to the acoustical dampening, apply a compensation filter to the acoustic signal to form a compensated acoustic signal that is reproduced. In one arrangement, the compensation filter can approximate an inverse of the acoustical dampening between the acoustic environment and the microphone. The microphone can be operatively and communicatively coupled to headwear, where the processor, responsive to an analysis of the change in the characteristic of the acoustic signal, can detect a presence of the headwear. The processor, from the analysis, can detect when the headwear is worn or removed, and apply the compensation filter to accommodate the headwear based on the presence of the headwear.

The processor can selectively adjust the spatial sensitivity of the headwear to sound in the user's local environment. The headwear can be one of a headset, earbud, earpiece or combination thereof. And, the processor actively detects when headwear is adjusted or fitted; it can be activated on a continuous or intermittent basis. In one arrangement, the compensation filter for the headwear can be activated via voice-activation. As an example, the processor detects an onset of the acoustical dampening from a first acoustic signal and responsive to the detected onset of the acoustical dampening applies the compensation filter. The communication device can be a portion of one of a computer system, a personal digital assistant, a cellular phone, a mobile phone, an earpiece or a head-worn communication device.

In a second embodiment, a method of compensating for acoustical dampening includes the steps of detecting an acoustic signal from an acoustic environment via a microphone, and detecting an acoustical dampening between the acoustic environment and the microphone based on a change in a characteristic of the acoustic signal, and, responsive to the acoustical dampening, filtering the acoustic signal using a compensation filter approximating an inverse of the acoustical dampening between the acoustic environment and the microphone. The microphone can be operatively coupled to headwear, and the processor, responsive to the change in the characteristic of the acoustic signal, detects a presence of the headwear. The headwear can be worn or removed, and apply the compensation filter to accommodate the headwear based on the presence of the headwear.

The processor can apply the compensation filter to selectively adjust a spatial sensitivity of the headwear to sound in the acoustic environment. The headwear can be one of a headset, earbud, earpiece or combination thereof. The processor can actively detect when headwear is adjusted or fitted; it can be activated on a continuous or intermittent basis. In one configuration, the compensation filter for the headwear can be activated via voice-activation. The processor can detect an onset of the acoustical dampening from a first acoustic signal and responsive to the detected onset of the acoustical dampening apply the compensation filter. The communication device can be a portion of one of a computer system, a personal digital assistant, a cellular phone, a mobile phone, an earpiece or a head-worn communication device.

BRIEF DESCRIPTION OF THE DRAWINGS

Exemplary embodiments of present invention will become more fully understood from the detailed description and the accompanying drawings, wherein:

FIG. 7 illustrates a cartilaginous region and a bony region of an ear canal;

FIG. 8 illustrates general physiology of an ear;

FIG. 9 and FIG. 10 illustrates two different views of an earphone;

DETAILED DESCRIPTION OF EXEMPLARY EMBODIMENTS OF THE PRESENT INVENTION

Figure 1A:
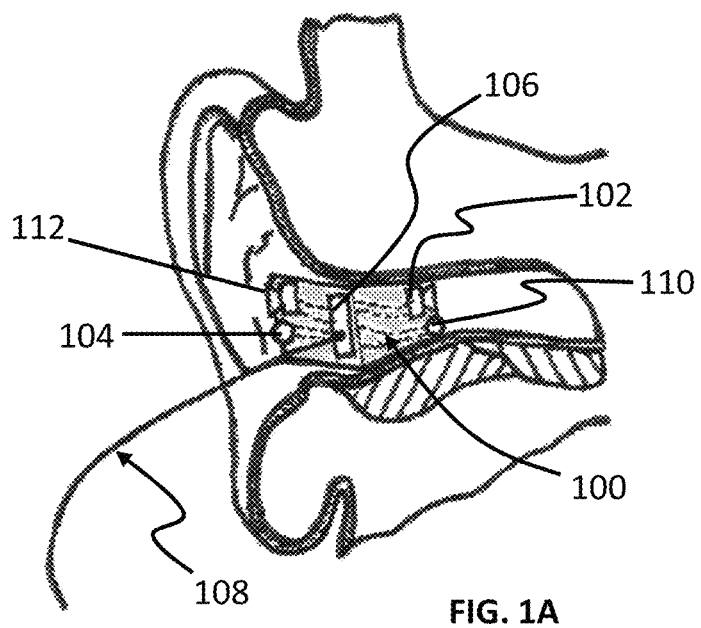
FIG. 1A illustrates one example of an acoustic dampening compensation device.

The following description of exemplary embodiment(s) is merely illustrative in nature and is in no way intended to limit the invention, its application, or uses.

Exemplary embodiments are directed to or can be operatively used on various wired or wireless earpieces devices (e.g., earbuds, headphones, ear terminals, behind the ear devices or other acoustic devices as known by one of ordinary skill, and equivalents).

Processes, techniques, apparatus, and materials as known by one of ordinary skill in the art may not be discussed in detail but are intended to be part of the enabling description where appropriate. For example specific computer code may not be listed for achieving each of the steps discussed, however one of ordinary skill would be able, without undo experimentation, to write such code given the enabling disclosure herein. Such code is intended to fall within the scope of at least one exemplary embodiment.

Additionally exemplary embodiments are not limited to earpieces, for example some functionality can be implemented on other systems with speakers and/or microphones for example computer systems, PDAs, BlackBerry® smartphones, cell and mobile phones, and any other device that emits or measures acoustic energy. Additionally, exemplary embodiments can be used with digital and non-digital acoustic systems. Additionally various receivers and microphones can be used, for example MEMs transducers, diaphragm transducers, for example Knowles' FG and EG series transducers.

Notice that similar reference numerals and letters refer to similar items in the following figures, and thus once an item is defined in one figure, it may not be discussed or further defined in the following figures.

At least one exemplary embodiment of the present invention is illustrated in FIG. 1A. The embodiment is a small headphone that is inserted in the ear of the user. The headphone consists of the sound-attenuating earplug 100 inserted into the ear. At the inner (eardrum-facing) surface of the earplug 100, an ear-canal loudspeaker receiver 102 is located for delivering an audio signal to the listener. At the outer (environment-facing) surface of the earplug 100, an ambient-sound microphone 104 is located. Both the loudspeaker 102 and the microphone 104 are connected to the electronic signal processing unit 106. The signal processing unit 106 also has a connector 108 for input of the audio signal. Additionally, an ear-canal microphone 110 is placed at the inner (eardrum-facing) surface of the earplug 100 and an external loudspeaker 112 is placed on the outer (environment-facing) surface of the earplug 100 for performing other functions of the headphone system not described here (such as monitoring of sound exposure and ear health conditions, headphone equalization, headphone fit testing, noise reduction, and customization).

Figure 1B:
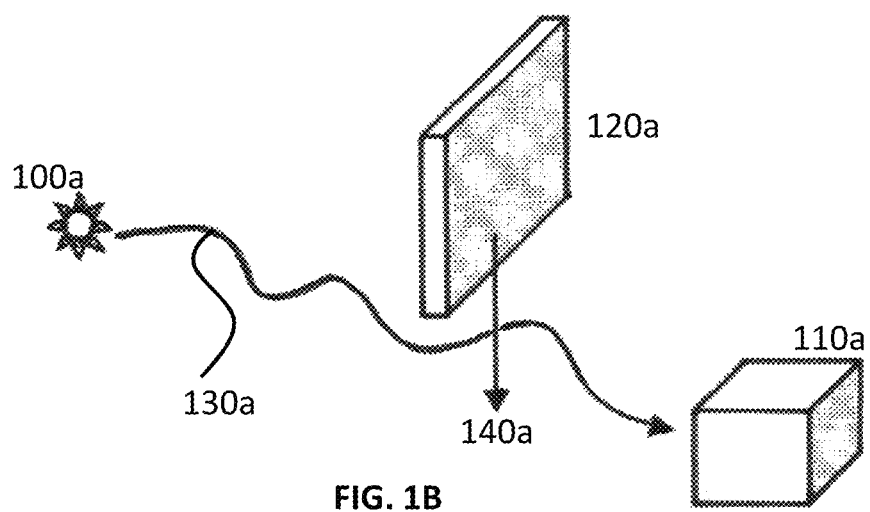
FIG. 1B illustrates one example of a situation of an acoustic dampening element affecting an acoustic signal.

FIG. 1B illustrates an example of an acoustic dampening element 120a, moving 140a into the path of an acoustic signal or wave 130a generated by an acoustic source 100a in ambient environment. The acoustic signal or wave 130a can be acoustically damped to some level by acoustic damping element 120a, so that the acoustic signal measured by the microphone 110a is affected.

Figure 2A:
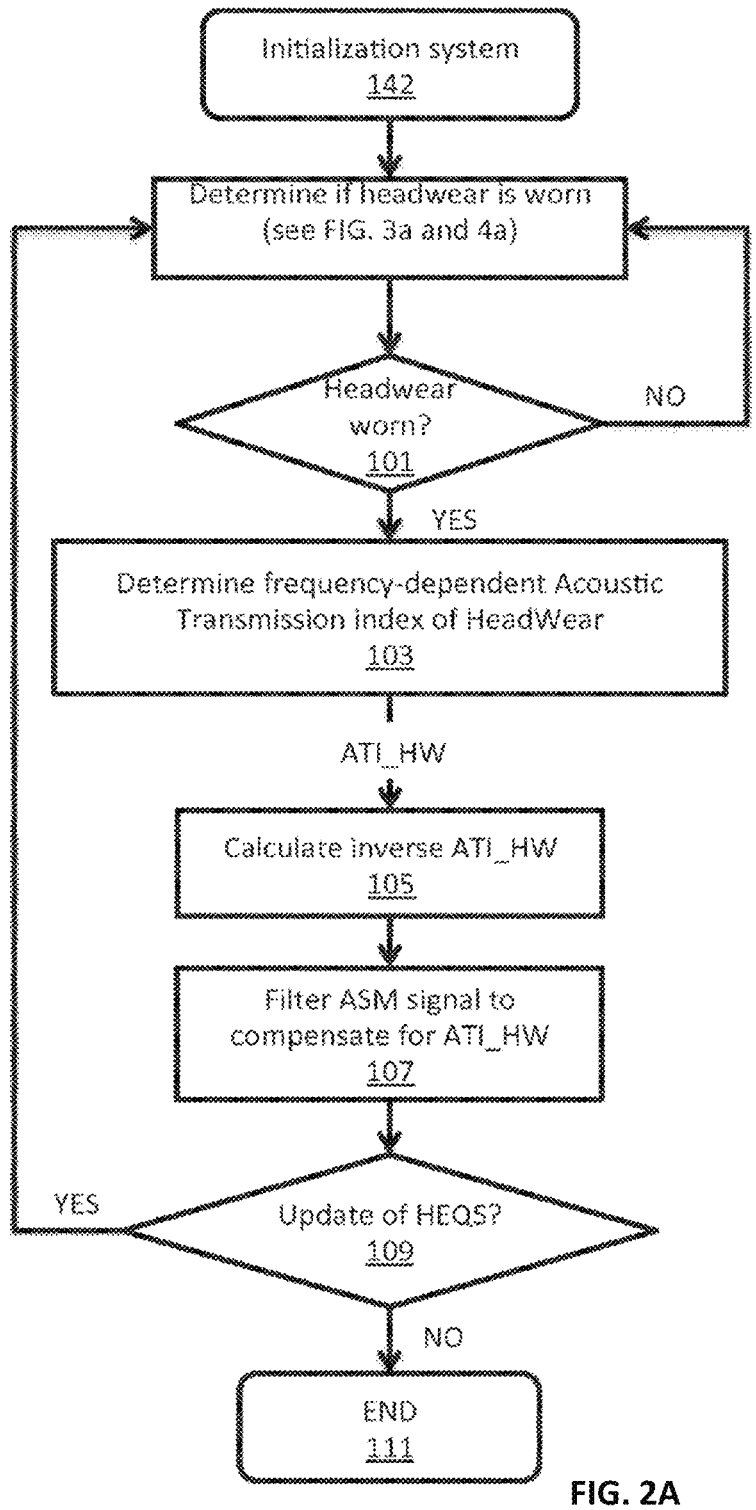
FIG. 2A is a flow chart of an acoustic compensation system according to at least one exemplary embodiment.

FIG. 2a depicts a general "top-level" overview of the Headwear acoustic Equalization System (HEQS). Initialization of the HEQS 142 may be manually invoked in a number of ways. One way is a manual activation; by either the HEQS user (i.e. that person wearing the headset system in FIG. 1A), or manually by a second person in a local or remote location (e.g. a supervisor). Another activation method is with an automatic mode, for instance in response to a loud sound or when the user dons headwear (e.g. a helmet). There are a number of methods for detecting headwear, as disclosed by the systems in FIGS. 3a and 4a. When headwear detection systems determine that headwear is worn, then decision unit 101 invokes a system 103 to determine the frequency dependent acoustic transmission index of the headwear (ATI_HW). An inverse of ATI_HW (inverse ATI_HW) 105 is calculated. The method for determining ATI_HW is described in FIGS. 5a and 5b. The ASM signal is then filtered 107 with a filter with a response approximating the inverse ATI_HW 105. This gives a modified ASM signal which approximates that the ASM signal with the headwear removed. The filter system 107 may use entirely analog circuitry or may use digital signal processing, e.g., using an FIR-type digital filter. Depending on the particular operating mode of the HEQS the ATI_HW may be updated on a continuous or intermittent basis, as determined by decision unit 109. If the operating mode is such that ATI_HW is calculated just once, then the update sequence is terminated 111.

Figure 2B:
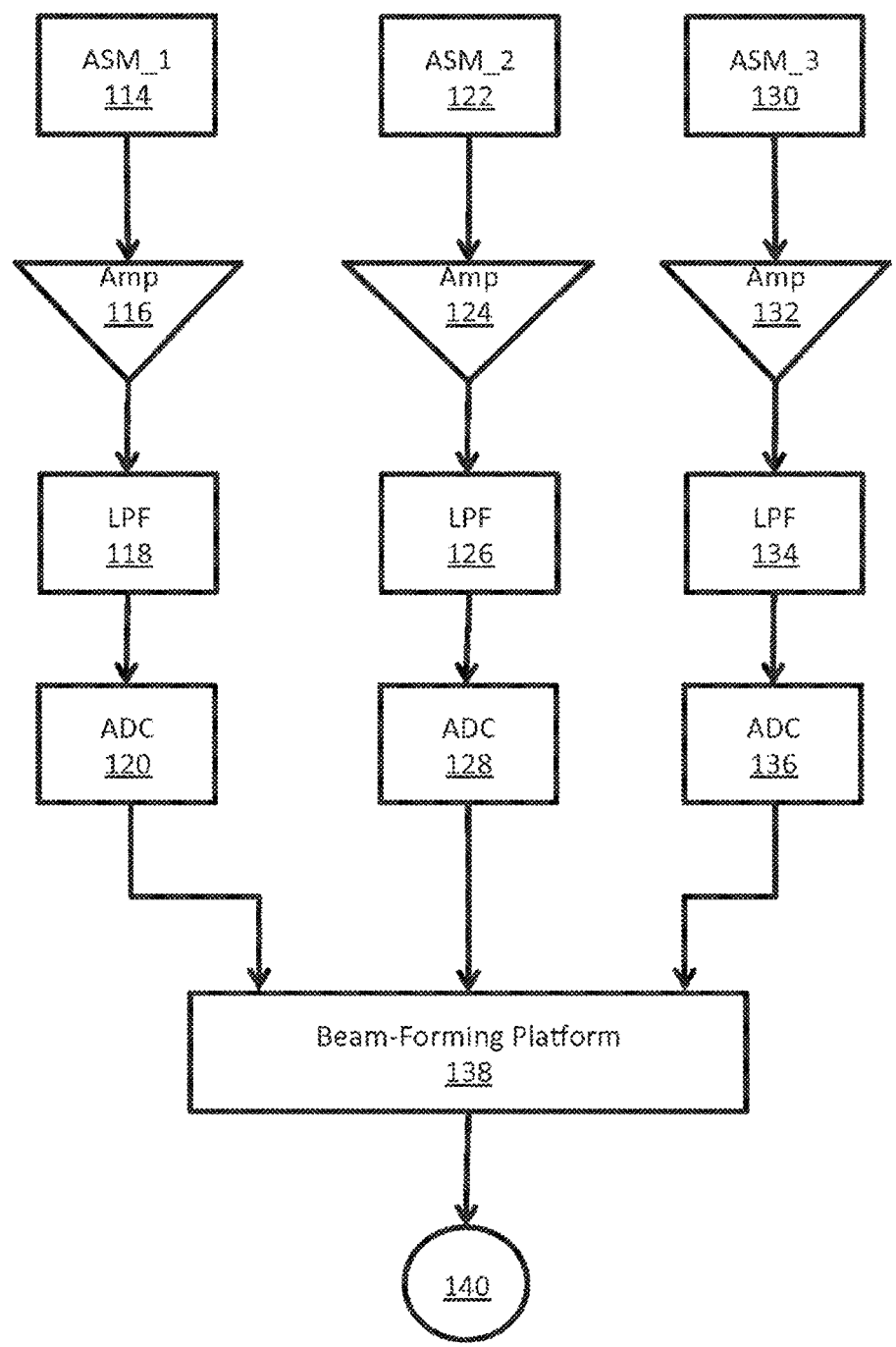
FIG. 2B is a block diagram of a microphone signal conditioner.

FIG. 2b describes an optional beam-forming platform 138. The beam forming platform 138 allows for the direction-dependent sensitivity of the microphones in the headset in FIG. 1 to be electronically manipulated. For instance, the sensitivity may be increased in the direction of the HEQS user's voice, and decreased in the direction of local noise sources, such as machine noise. The beam-forming platform 138 takes as its inputs at least three Ambient Sound Microphones (ASMs) 114, 122, 130. The analog signal is then amplified (amp) 116, 124, 132, and then filtered with a Low Pass Filter (LPF) 118, 126, 134 to prevent frequency aliasing by the Analog to Digital Converters (ADC) 120, 128, 136.

The beam-forming platform 138 may also take as its input signal the output signal from ASMs in both the left and right headsets worn by the HEQS user. The output signal 140 for each headset is considered the "conditioned ASM signal" in other figures in the present invention.

Figure 3A:
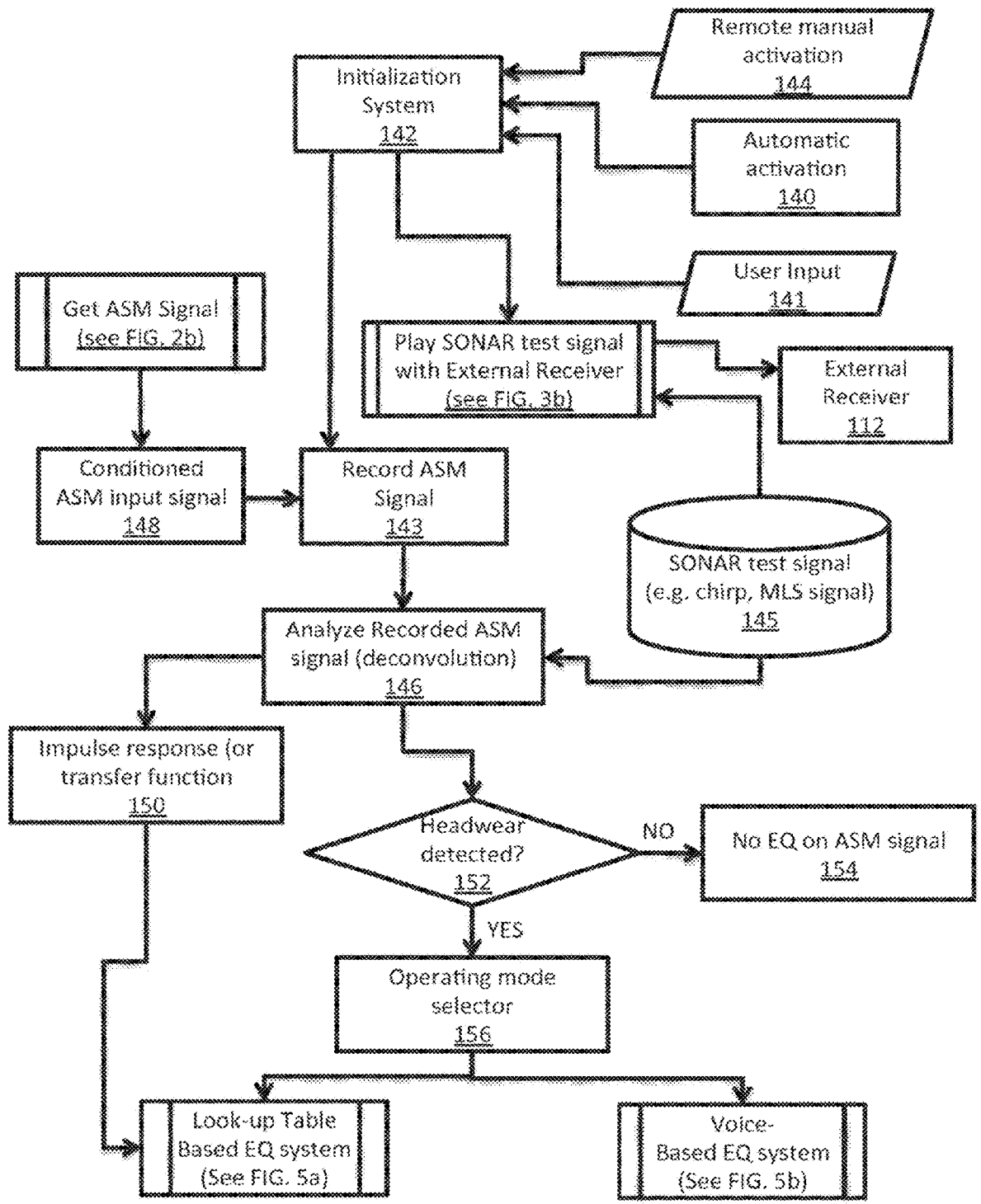
FIG. 3A illustrates at least one method of detecting whether an acoustic dampening event occurs in accordance with at least one exemplary embodiment.

FIG. 3a depicts the SONAR-based headwear detection platform. This system detects the presence of headwear using a SONAR-based system. Activation of this system 142 may be manually by a remote second person 144 or by the HEQS user 141, or may be automatic 140 e.g. with a computer timer. A SONAR test signal is reproduced with the External Receiver (ER) 112 whilst simultaneously recording 143 the conditioned ASM signal 148. The SONAR test signal 145 may be one of a number of specific test signals, as described in FIG. 3b. The recorded ASM signal 143 is analyzed 146 to extract the time-domain impulse response (IR) or frequency domain transfer function 150. The frequency-domain transfer function may be obtained empirically by dividing the spectral frequency profile of the SONAR test signal 145 by the spectral frequency profile of the recorded ASM signal 143 (if the spectral frequency profile is logarithmic, then this would be a subtraction of the two profiles). Alternatively, an adaptive filter such as one based on the LMS algorithm may be used to iteratively approximate the time-domain impulse response or frequency domain transfer function. If a maximum-length sequence (MLS) SONAR test signal is used, then the time-domain IR may be obtained by cross-correlation of the MLS and recorded ASM signa 1143. The resulting IR is then analyzed to detect headwear. This is undertaken by detecting features in the IR representative of strong sound reflections at time delays consistent with headwear; for instance, if a helmet is worn, then a reflection from the brim is expected at about 0.6 ms for a brim that is 10 cm from the headset. If close-fitting headwear is worn, such as a balaclava or fire-proof hood, then a higher-level IR would be observed (especially at high frequencies) compared with the case when no headwear is worn. If no headwear is worn, then decision unit 152 determines that no additional filtering of the ASM signal is undertaken 154. However, if the analysis of the obtained IR 146 predicts that headwear is worn, then depending on the particular operating mode 156 (which may be set with the initialization system 142) filtering of the ASM signal may be invoked with either a look-up table based EQ system (FIG. 5a) or a voice-based EQ system (FIG. 5b).

Figure 3B:
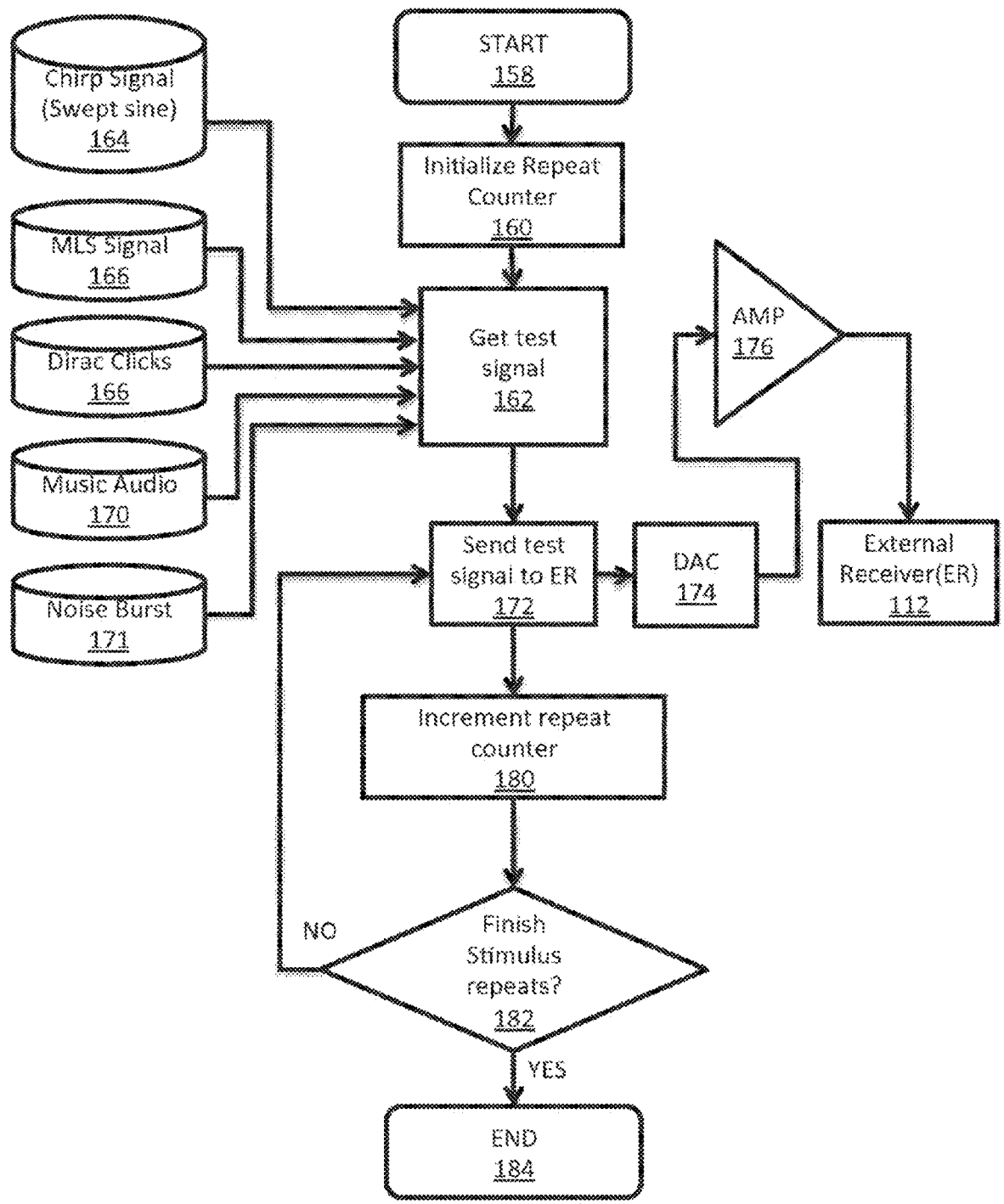
FIG. 3B illustrates at least one further method of detecting whether an acoustic dampening event occurs in accordance with at least one exemplary embodiment.
Figure 5A:
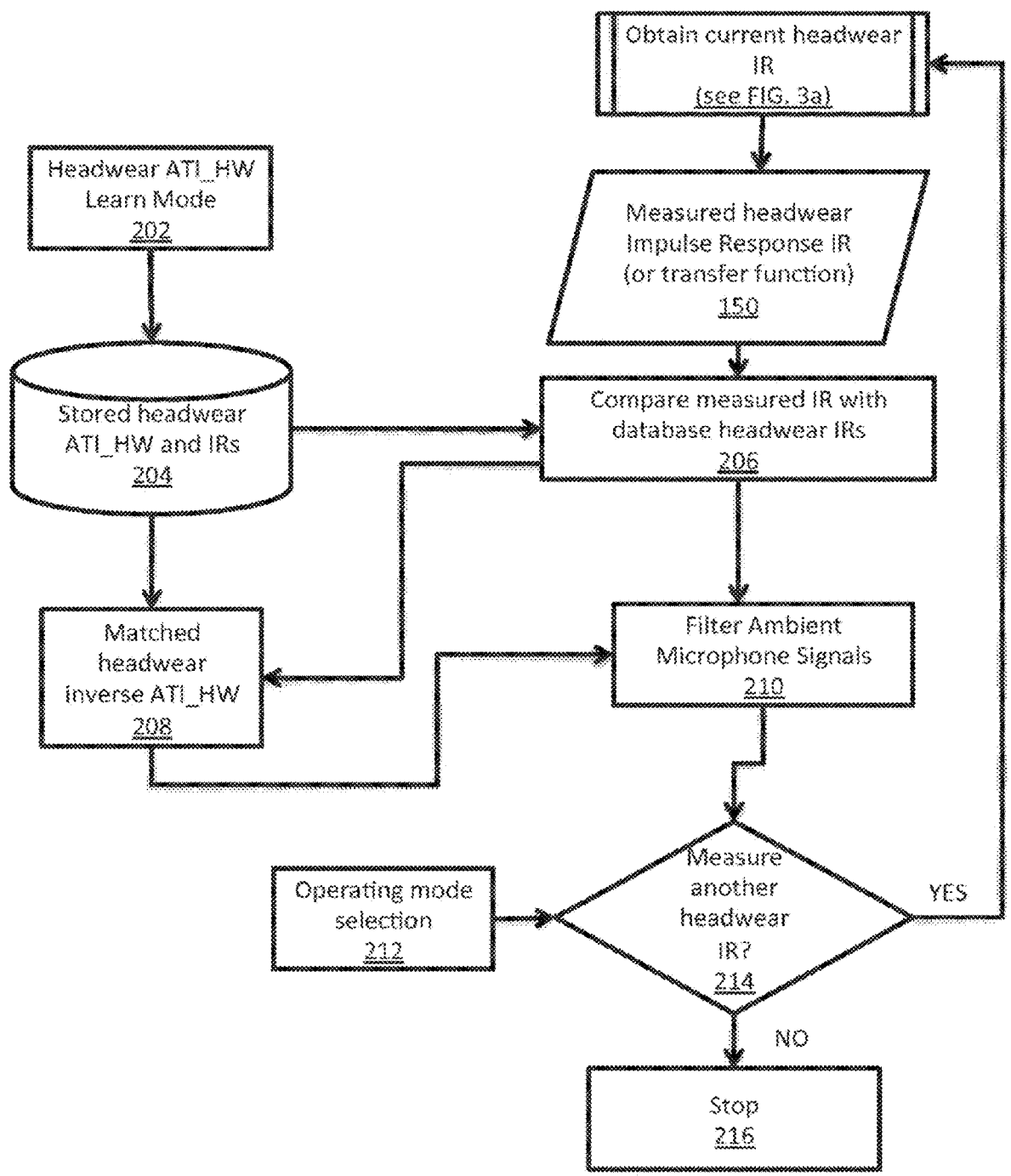
FIG. 5A illustrates a block diagram of a parameter look up system in accordance with at least one exemplary embodiment.
Figure 5B:
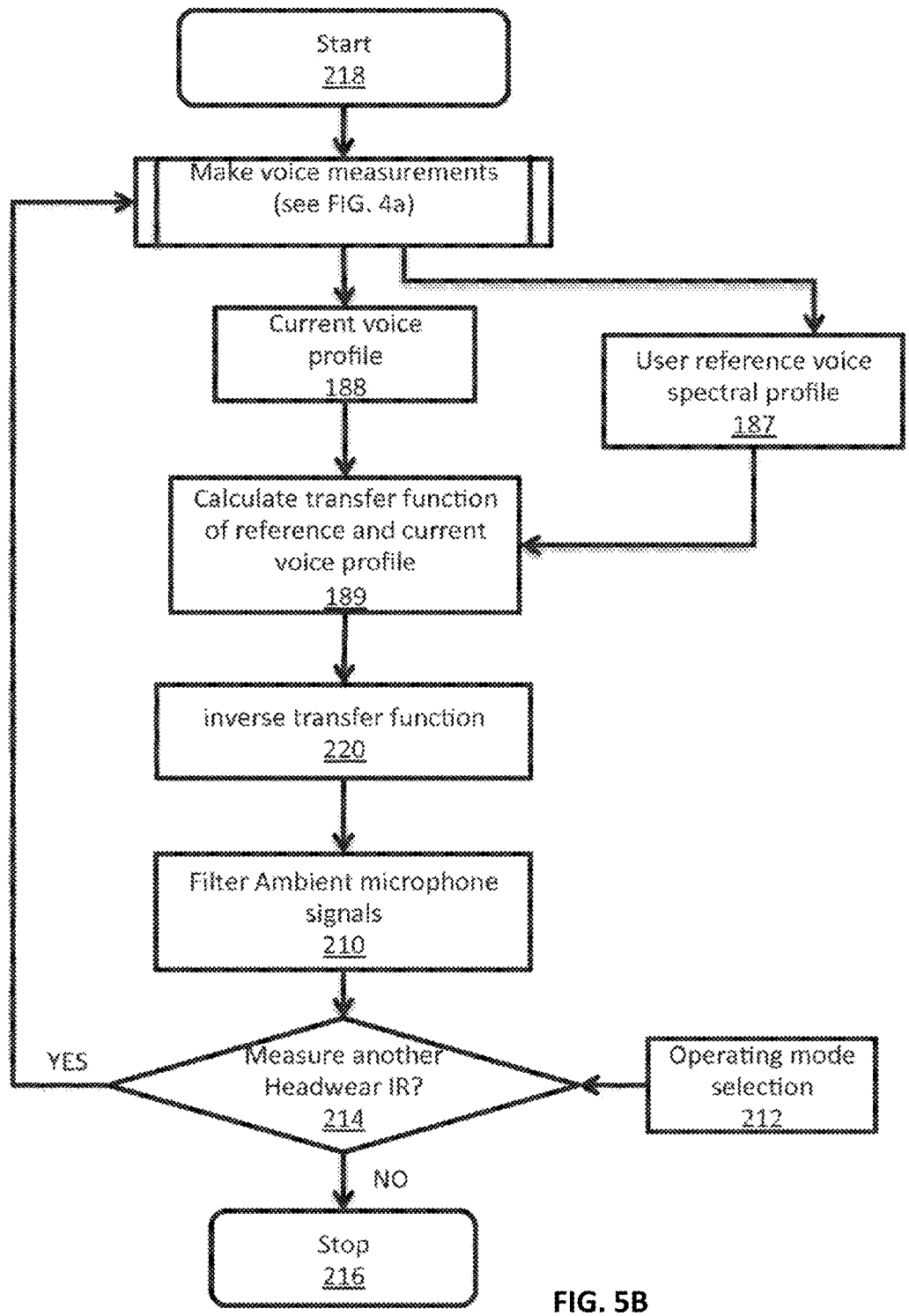
FIG. 5B illustrates a headwear equalization system in accordance with at least one exemplary embodiment.

FIG. 3b depicts the assembly for generating the SONAR test signal used by the SONAR-based headwear detection platform in FIG. 3b, and also for the system which determines the acoustic transmission index of the headwear described in FIG. 5a. When the SONAR test signal is needed, the activation command 158 initializes a counter 160 which keeps a record of the number of repetitions of the test stimulus (i.e. how many averages the analysis system makes). The particular test signal used may be one of a number of signals; a frequency sweep 164 (ideally this so-called chirp signal is from a lower frequency to a higher frequency with a logarithmic rather than linear incremental sweep). Single or multi-frequency sine-waves may also be used to give a frequency-dependent acoustic transfer function. A Maximum Length Sequence (MLS) signal 166 is often used to measure acoustic impulse responses. Transient (Dirac) impulses 168 give an IR directly. Music audio 170 may be used to measure the transfer function, as well as noise bursts 171 which may be narrow-band filtered. Once the audio test signal is acquired 162, the signal is sent 172 to the external receiver (ER) 112 via digital to analog conversion (DAC) 174 and analog amplification (amp) 176 (which may be frequency-dependent to compensate for the electroacoustic sensitivity of the loudspeaker). A digital counter 180 tracks the number of times the audio test signal is repeatedly reproduced with the ER, and decision unit 182 terminates reproduction of the test signal 184 when the number of repeats is sufficient.

Figure 4A:
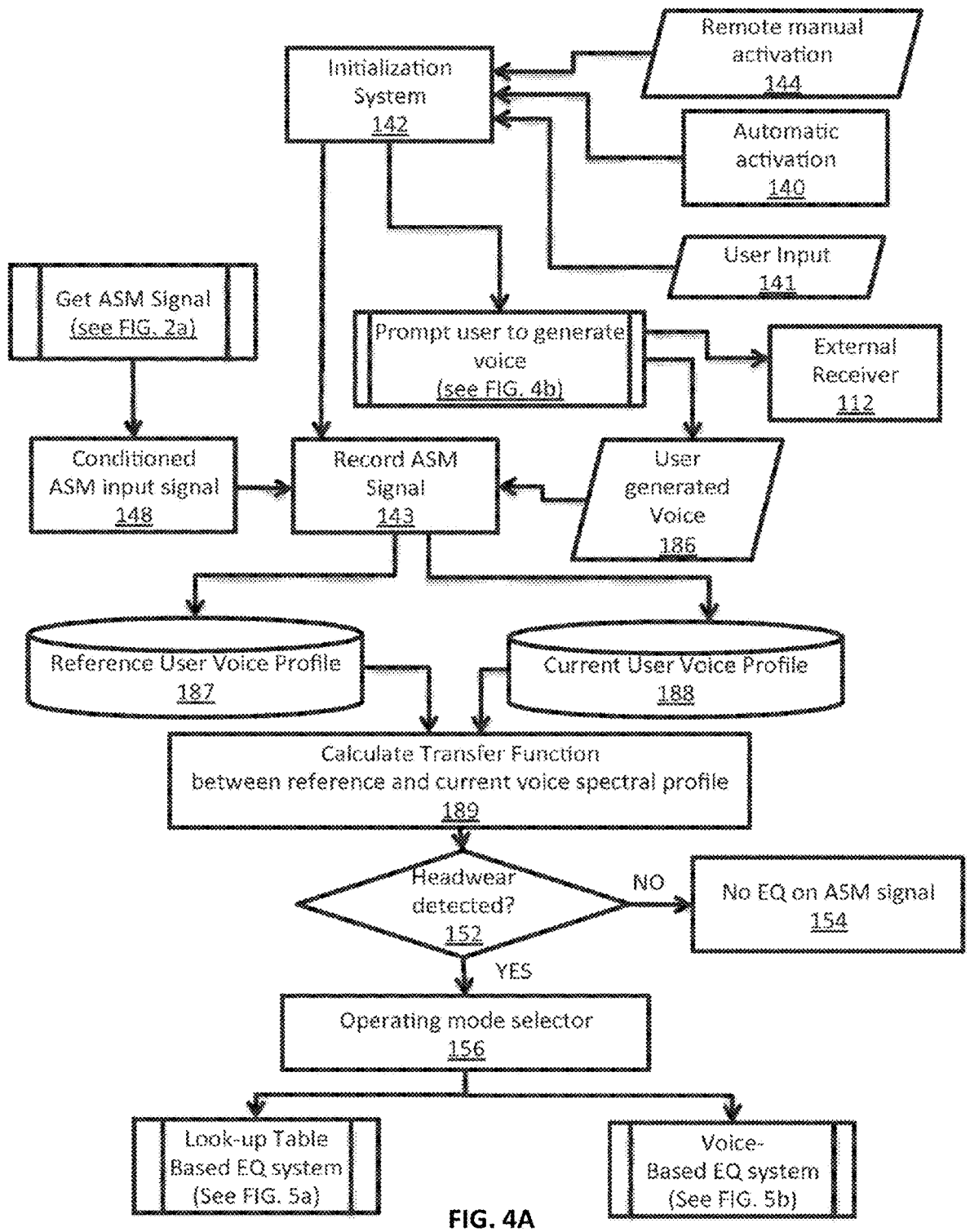
FIG. 4A illustrates at least one further method of detecting whether an acoustic dampening event occurs in accordance with at least one exemplary embodiment.

Alternative to the SONAR-based system in FIG. 3a is the Voice-based headwear detection platform described in FIG. 4a. This system detects the presence of headwear using a user-generated voice. Activation of this system 142 may be manually by a remote second person 144 or by the HEQS user 141, or may be automatic 140 e.g., with a computer timer. The headwear is detected by analyzing the conditioned ASM signal 148 in response to user-generated voice 186. The prompting system for the user to speak is described in FIG. 4b. The recorded ASM signal is analyzed by unit 143 when there is no headwear present to give a reference user voice spectral profile 187. When the user dons headwear, they are prompted to speak (see FIG. 4b) and a second ASM recording is made to give a current user voice spectral profile 188. The reference user voice spectral profile 187 and current user voice spectral profile 188 are compared with unit 189 to give a transfer function which is analyzed to predict if headwear is worn. This analysis system may, for instance, determine that headwear is worn if the transfer function indicates that high-frequency content (e.g. at particular frequencies such as 1 kHz and 4 kHz) are attenuated in the current user voice spectral profile 188 compared with the reference user voice spectral profile 187 (e.g. are <5 dB at these particular frequencies). If this analysis unit 189 determines that headwear is not worn, then decision unit 152 does not filter the ASM signal 154. Alternately, if analysis unit 189 determines that headwear is worn, then decision unit 152 further determines the frequency dependent acoustic transmission index of the headwear (ATI_HW) that is used to filter the ASM signal (i.e. with a filter response approximating the inverse of ATI_HW). ATI_HW is calculated depending on the particular operating mode, as determined by unit 156. These two operating modes are described in FIG. 5a and FIG. 5b.

Figure 4B:
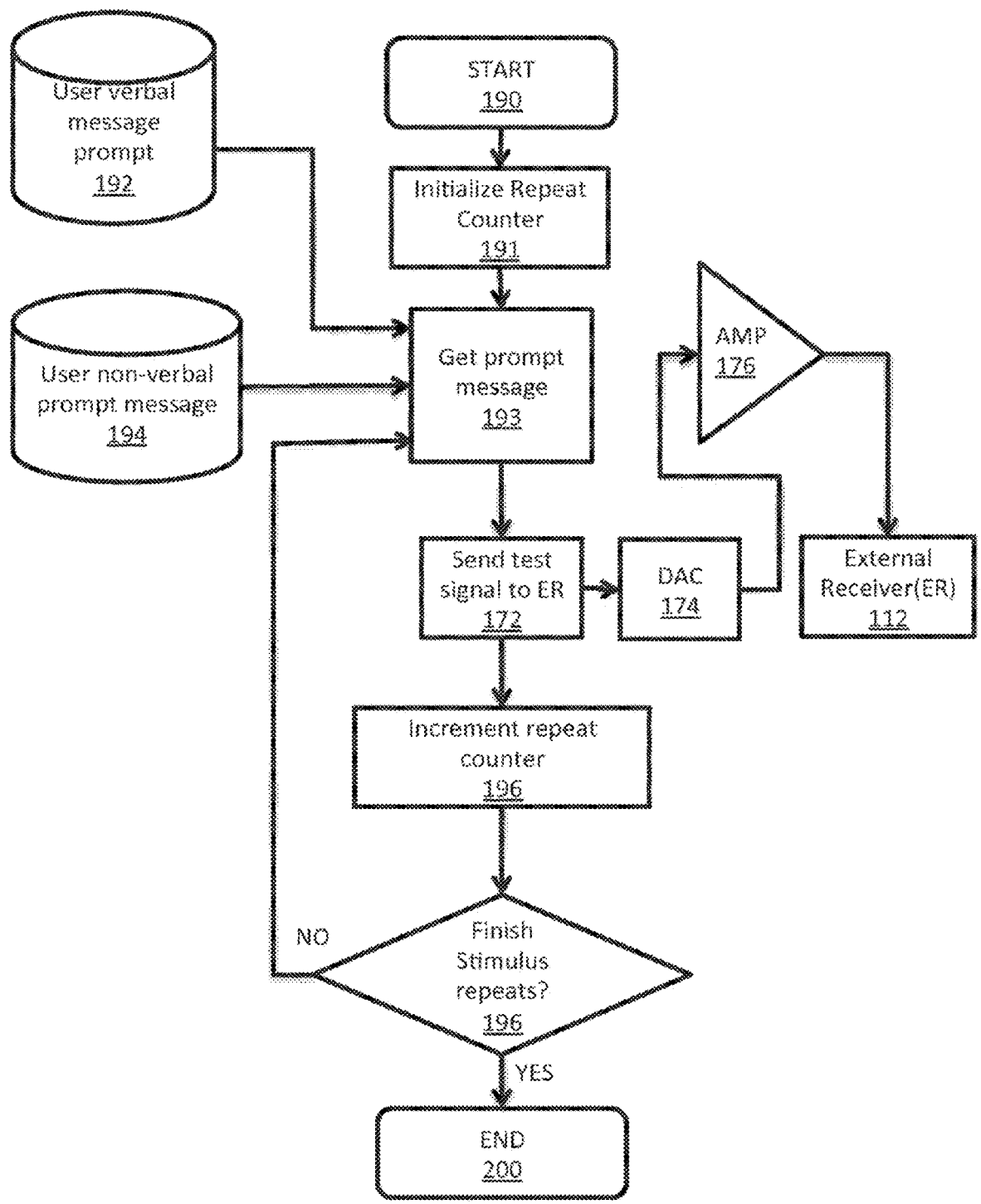
FIG. 4B illustrates a user voice spectral profile acquisition system in accordance with at least one exemplary embodiment.

FIG. 4b describes the user-prompting system for the voice-based headwear detection platform. Activation command 190 initializes a counter 191 which keeps a record of the number of repetitions of the test stimulus. Either a pre-recorded verbal message 192 or non-verbal message 194 (e.g. a tone) is acquired 193 as a prompt message. The prompt message sent 172 to external receiver 112 (after digital to analog conversion 174 and analog amplification 176) and is reproduced with the External Receiver 112 for the user to speak either a specific set of words (e.g. a phonetically balanced word list) or general words (e.g. normal conversation) or non-speech sounds (such as a whistle or hand-clap). This prompt may be repeated a number of times, according to the incremental repeat counter 196 and decision unit 198 which terminates 200 the prompt message after a pre-defined number of repeated message prompts.

FIG. 5a describes a system for determining the acoustic transmission index of the headwear (ATI_HW). This is a frequency dependent value for the free-field acoustic absorption of the headwear from an external sound source to a measurement point on the other side of the headwear (specifically, measured at the entrance to the user's ear canal). The system uses the SONAR headwear detection platform described in FIG. 3a to obtain a headwear impulse response 150. It should be noted that this is not the same as the ATI_HW; rather, it is the impulse response obtained by emitting a SONAR test signal from the external receiver (112 in FIG. 1) and recording the sound response at the ASM 104 (or conditioned ASM signal 140 in FIG. 2b). In a particular optional learn mode 202, the IR of different headwear may be measured empirically, and their corresponding ATI_HW is also measured and stored in computer memory 204. The recently measured headwear IR 150 is then compared and matched with measured IRs in the database 204 using matching unit 206 (matching may be accomplished using a standard least mean squares difference approach). When the current headwear has been matched to one in the database, then the ASM signal 140 is filtered with an impulse response (or frequency-domain transfer function) which approximates the inverse of the matched ATI_HW 208. The filtering of the ASM signal by unit 210 may be accomplished using a digital FIR-type filter or an IIR-type digital filter, or a multi-band analog audio signal filter. Depending on the particular operating mode of the HEQS selected by the user (or automatically selected) with selecting device 212, the ATI_HW may be continually updated by decision unit 214. The process may be terminated at step 216.

FIG. 5b describes an alternative method to that system in FIG. 5a, for determining the ATI_HW of the headwear worn by the HEQS user. The method in FIG. 5b begins at step 218 and uses a measure of the user's reference voice spectral profile 187. This is a spectral profile of the (conditioned) ASM signals when no headwear is worn in response to user-generated speech or non-speech (e.g. hand-claps). This is compared to the current ASM spectral profile 188 when the user is wearing headwear. The comparison is undertaken by unit 189, which may be a simple spectral subtraction (in the logarithmic or decibel domain), or may be a division of the linear spectral magnitude. The resulting transfer function approximates ATI_HW, and its inverse is calculated by unit 220 to give a data vector which can be used to filter the ASM signals with filter unit 210 (as previously described for FIG. 5a). The process may be terminated at step 216.

Figure 6:
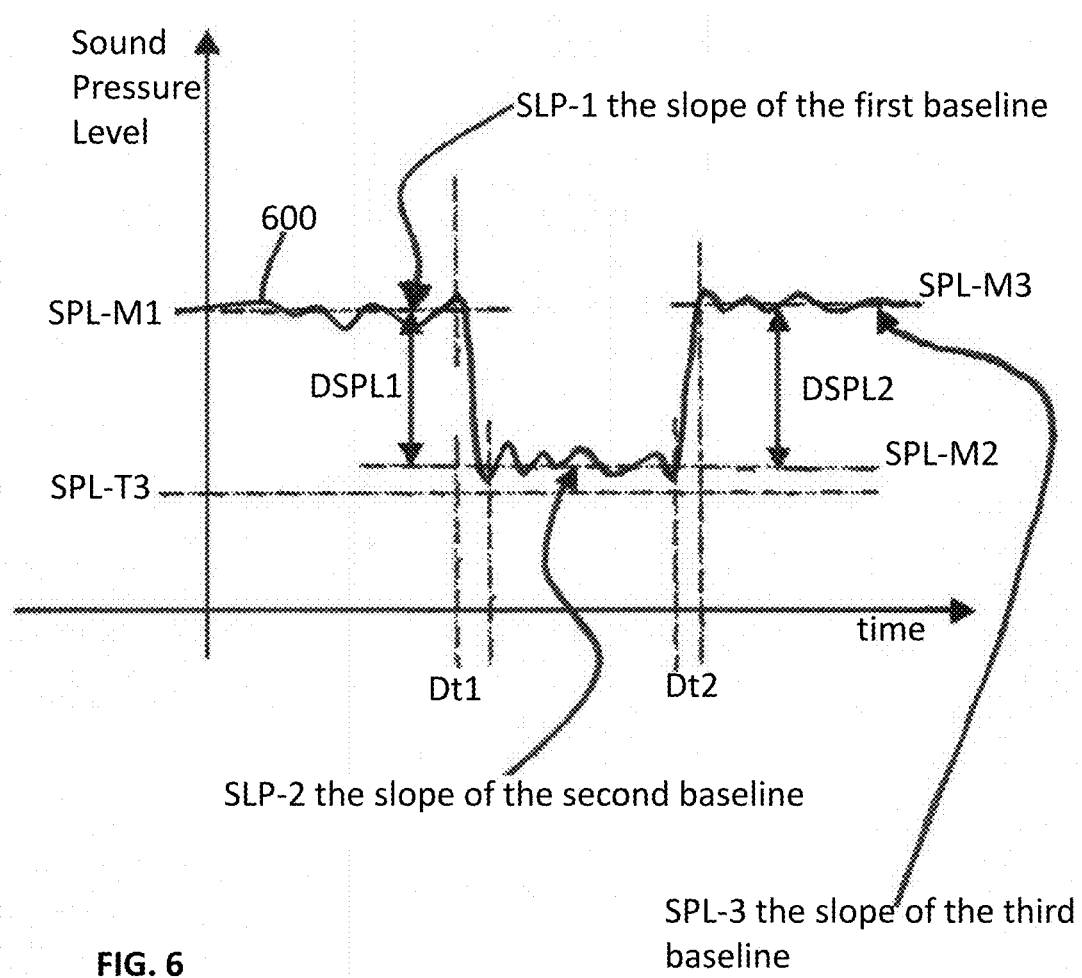
FIG. 6 illustrates an example of detecting a drop in sound pressure levels using the rate of change, mean values, slopes and other parameters in accordance with at least one exemplary embodiment.

FIG. 6 illustrates an acoustic signal 600 displayed in a non-limiting manner as the sound pressure level versus time, t. In this non-limiting example acoustic signal 600 is broken into three regions. The first region can be characterized by an average value SPL-M1, with an associated baseline (e.g., a line fit utilizing least squares) having a slope SLP-1. Similarly the second and third regions can be characterized by an average value SPL-M2 and SPL-M3 respectively, with an associated baseline (e.g., a line fit utilizing least squares) having slopes SLP-2 and SLP-3 respectively. FIG. 6 illustrates the situation where a microphone (throughout the duration) is measuring the acoustic signal 600, the measurement plotted in FIG. 6. At the onset of an acoustic dampening event (e.g., sheet placed on microphone, headwear placed over earpiece microphone) the measured Sound Pressure Level (SPL) value decreases from SPL-M1 to SPL-M2 over a period of time Dt1. The rate of decrease, $[(SPL-M2)-(SPL-M1)]/Dt=R1$, can be compared to a threshold value T1 to aid in determining if an acoustic dampening event has occurred. For example if R1=20 dB/sec, and T1=10 dB/sec, and the criteria for an acoustic dampening effect (e.g., rather than an acoustic source shut off) is $|R1|<T1$, then if $|R1|<T1$ (note that a criteria R1>T1 can also be used as well as an equality relationship) as it is in the example can be used as an indication of an acoustic dampening event rather than an acoustic source shut off. Note that in the example illustrated in FIG. 6, the acoustic dampening event is removed resulting in an increase from SPL-M2 to SPL-M3 in time Dt2. The rate of change, $R2=[(SPL-M3)-(SPL-M2)]/Dt2$, can be compared with a threshold T2 in a similar manner as described above for T1. Another threshold that can be used is the dropped sound pressure levels (DSPL1, DSPL2) average baseline value, for example if SPL-M2>SPL-T3 then this can be used as an indication that an acoustic dampening event has occurred rather than an acoustic source shut off. For example if the threshold value SPL-T3 is effective quiet (e.g., 80 dB) then if SPL-M2 drops to below SPL-T3 then this can be indicative of an acoustic source being turned off.

Other criteria can also be used as indicators of an acoustic dampening event occurring. For example if the slopes of the baselines before and after shifting are significantly different this can be indicative of an acoustic source shut off rather than an acoustic dampening event. For example if $|SLP-2-SLP-1|>|(SLP-1/2)|$, this could be indicative that an acoustic source has been turned off and that possibly the slope of the second baseline (SLP-2) is close to zero.

Further Exemplary Embodiments

The following paragraphs list various other exemplary embodiments of the invention. The list is meant as illustrative only not as a limitative list of embodiments.

A self-contained Headwear Acoustic Equalization system (HEQS) to compensate for the acoustic filtering of headwear (hats, helmets, fire-proof headwear etc.) is herein described. The Headwear Acoustic Equalization System (HEQS) empirically measures or determines the acoustic filtering properties of a head garment on a continuous, intermittent, or discrete basis. The acoustic filtering properties are used to compensate for the change in response of a microphone mounted on the user's head (e.g. at or near the entrance to the ear canals) from an external sound source (e.g. voice) by filtering the microphone signal with an audio signal filter (which may be adaptive or one from a pre-defined filter database). The HEQS comprises:

A. An assembly to monitor the acoustic field in a user's immediate environment using one or more Ambient Sound Microphones (ASMs) located near to or at the entrance to one or both occluded ear canals.

B. A signal processing circuit to amplify the signals from the ASMs in (A) and to equalize for the frequency sensitivity of the microphones and to low-pass filter (LPF) the signals prior to digital conversion to prevent aliasing (with the cut-off frequency of the LPF equal or less than half the sampling frequency of the digital sampling system).

C. An analog-to-digital converter (ADC) to convert the filtered analog signals in (B) to a digital representation.

D. An optional beam-forming platform that takes as its inputs the digital signals from the ASMs from one or both headsets to selectively affect the spatial sensitivity of the headset to sound in the user's local environment.

E. An assembly to generate a desired SPL at or near the entrance to one or both occluded (or partly occluded) ear canals consisting of a loudspeaker receiver mounted in an earplug that forms an acoustic seal of the ear canal. (This is the External Receiver; ER).

F. A signal processing circuit to amplify the signal to the ER to equalize for the frequency sensitivity of the transducer.

G. A digital-to-analog converter (DAC) to convert a digital audio signal into an analog audio signal for reproduction with the ER.

H. A HEQS initialization system to start the HEQS; which may be manually initialized by the user with voice-activation or with a physical switch, or may include remote activation by a second person, or may be automatically activated by a system which detects when headwear is adjusted or fitted, or may be activated on a continuous or intermittent basis.

I. A system to detect whether the HEQS user is wearing headwear. Examples of headwear include: a military helmet, a SWAT hood, balaclava, cold-weather face mask, helmet liner, neoprene camouflage face mask, religious headwear such as a burka or turban, or a fireproof face mask as typically worn by fighter pilots and fire-service workers (fire men/women).

J. A system to determine the frequency-dependent acoustic attenuation of the headwear from an ambient sound source (such as the user's voice or a sound-creating object in the environment of the user) to the ASM(s). This attenuation transmission index is called ATI_HW.

K. A system to filter the ASM signal with the inverse of the ATI_HW of the headwear, so as to give an ASM signal similar to that with the headwear absent.

L. A system to update the ATI_HW automatically on a continuous basis.

M. A system to update the ATI_HW manually from either a user-generated command or a command issued by a second remote person.

N. A system to update the ATI_HW automatically on an intermittent basis (e.g. every 10 minutes).

O. A system to transmit the ATI_HW to a data storage or analysis system using a wired or wireless data transmission system.

Another embodiment of the invention enables the HEQS to automatically determine if headwear is worn using a self-contained SONAR-based headwear detection platform. A SONAR test sound is emitted with an external receiver mounted on the headset device, and its sound reflection is detected using one or more ambient sound microphones mounted on the same headset. The reflected sound is analyzed to determine the presence of headwear. This SONAR-based headwear detection platform comprises:

A. An assembly to monitor the acoustic field in a user's immediate environment using one or more Ambient Sound Microphones (ASMs) located near to or at the entrance to one or both occluded ear canals.

B. A signal processing circuit to amplify the signals from the ASMs in (A) and to equalize for the frequency sensitivity of the microphones and to low-pass filter (LPF) the signals prior to digital conversion to prevent aliasing (with the cut-off frequency of the LPF equal or less than half the sampling frequency of the digital sampling system).

C. An analog-to-digital converter (ADC) to convert the filtered analog signals in (B) to a digital representation.

D. An optional beam-forming platform that takes as its inputs the digital signals from the ASMs from one or both headsets to selectively affect the spatial sensitivity of the headset to sound in the user's local environment.

E. An assembly to generate a desired SPL at or near the entrance to one or both occluded (or partly occluded) ear canals consisting of a loudspeaker receiver mounted in an earplug that forms an acoustic seal of the ear canal. (This is the External Receiver; ER).

F. A signal processing circuit to amplify the signal to the ER to equalize for the frequency sensitivity of the transducer.

G. A digital-to-analog converter (DAC) to convert a digital audio signal into an analog audio signal for reproduction with the ER.

H. An initialization system to start the SONAR-based headwear detection platform; which may be manually activated by the user with voice-activation or with a physical switch, or may be remotely activated by a second person, or may be automatically activated by a system which detects when headwear is adjusted or fitted, or may be activated on a continuous or intermittent basis.

I. A system to generate or retrieve from computer memory a SONAR audio data test signal. This signal may be one of the following types:
a. Swept sine "chirp" signal.
b. Maximum Length Sequence (MLS) test signal. c. Dirac transient click signal.
d. Music audio signal.
e. Noise signal (white noise or pink noise).

J. Circuitry to reproduce the audio test signal in (I) with the external receiver.

K. A system to simultaneously record the ASM signal whilst the test signal in (I) is reproduced with the ER.

L. A system to repeat the reproduction of the test signal in (1).

M. A system to analyze the recorded ASM signal in response to the SONAR test signal to determine if headwear is worn. This system comprises a method to deconvolve the recorded ASM signal to give a time domain impulse response or frequency domain transfer function with reference to the original SONAR test audio signal.

N. A system to determine if headwear is worn by analysis of the deconvolved test impulse response (IR) or transfer function (TF) in (M) with respect to a reference IR or TF made with no headwear worn.

Another embodiment of the invention enables the HEQS to automatically determine the frequency-dependent acoustic absorption characteristics of the headwear worn by a user (this is the Headwear acoustic Attenuation Transmission Index or ATI_HW). Once obtained, the ASM signal is filtered with a filter corresponding to the inverse of ATI_HW. This self-contained SONAR-based headwear determination platform uses a SONAR test sound emitted with an external receiver mounted on the headset device, and its sound reflection is detected using one or more ambient sound microphones mounted on the same headset. The reflected sound is analyzed to determine the headwear using a look-up table analysis with previous measurements of known headwear. This SONAR-based headwear determination platform comprises:

A. An assembly to monitor the acoustic field in a user's immediate environment using one or more Ambient Sound Microphones (ASMs) located near to or at the entrance to one or both occluded ear canals.

B. A signal processing circuit to amplify the signals from the ASMs in (A) and to equalize for the frequency sensitivity of the microphones and to low-pass filter (LPF) the signals prior to digital conversion to prevent aliasing (with the cut-off frequency of the LPF equal or less than half the sampling frequency of the digital sampling system).

C. An analog-to-digital converter (ADC) to convert the filtered analog signals in (B) to a digital representation.

D. An optional beam-forming platform that takes as its inputs the digital signals from the ASMs from one or both headsets to selectively affect the spatial sensitivity of the headset to sound in the user's local environment.

E. An assembly to generate a desired SPL at or near the entrance to one or both occluded (or partly occluded) ear canals consisting of a loudspeaker receiver mounted in an earplug that forms an acoustic seal of the ear canal. (This is the External Receiver; ER).

F. A signal processing circuit to amplify the signal to the ER to equalize for the frequency sensitivity of the transducer.

G. A digital-to-analog converter (DAC) to convert a digital audio signal into an analog audio signal for reproduction with the ER.

H. An initialization system to start the SONAR-based headwear detection platform; which may be manually activated by the user with voice-activation or with a physical switch, or may be remotely activated by a second person, or may be automatically activated by a system which detects when headwear is adjusted or fitted, or may be activated on a continuous or intermittent basis.

I. A system to generate or retrieve from computer memory a SONAR audio data test signal. This signal may be one of the following types:
a. Swept sine "chirp" signal.
b. Maximum Length Sequence (MLS) test signal. c. Dirac transient click signal.
d. Music audio signal.
e. Noise signal (white noise or pink noise).

J. Circuitry to reproduce the audio test signal in (I) with the external receiver.

K. A system to simultaneously record the ASM signal whilst the test signal in (I) is reproduced with the ER.

L. A system to repeat the reproduction of the test signal in (I).

M. A system to analyze the recorded ASM signal in response to the SONAR test signal to determine if headwear is worn. This system comprises a method to deconvolve the recorded ASM signal to give a time domain impulse response or frequency domain transfer function with reference to the original SONAR test audio signal.

N. A system to determine if headwear is worn by analysis of the deconvolved test impulse response (IR) or transfer function (TF) in (M) with respect to a reference IR or TF made with no headwear worn.

O. A system to determine what headwear is worn by the user by comparing the empirically obtained IR or TR with a library of measured IRs or TRs previously obtained. The empirically obtained IR or TR is matched with the particular previously measured IR or TR using, for example, the method of least-squared difference.

P. A system to obtain the ATI_HW of the worn headwear using a look-up table of previously measured ATI_HW's corresponding to particular headwear IR's.

Q. A system to filter the ASM signal with a filter corresponding to the inverse of the obtained ATI_HW. In an exemplary embodiment, this filter is a digital FIR-type filter.

Another embodiment of the invention enables the HEQS to automatically determine if headwear is worn using a self-contained Voice-based headwear detection platform. A Voice test sound is generated by the HEQS user, and is simultaneously detected using one or more ambient sound microphones mounted on the same headset. In some embodiments the user-generated sound is a non-voice sound such as a hand-clap or mouth whistle. The measured sound is analyzed to determine the presence of headwear. This Voice-based headwear detection platform comprises A. An assembly to monitor the acoustic field in a user's immediate environment using one or more Ambient Sound Microphones (ASMs) located near to or at the entrance to one or both occluded ear canals.

B. A signal processing circuit to amplify the signals from the ASMs in (A) and to equalize for the frequency sensitivity of the microphones and to low-pass filter (LPF) the signals prior to digital conversion to prevent aliasing (with the cut-off frequency of the LPF equal or less than half the sampling frequency of the digital sampling system).

C. An analog-to-digital converter (ADC) to convert the filtered analog signals in (B) to a digital representation.

D. An optional beam-forming platform that takes as its inputs the digital signals from the ASMs from one or both headsets to selectively affect the spatial sensitivity of the headset to sound in the user's local environment.

E. A digital-to-analog converter (DAC) to convert a digital audio signal into an analog audio signal for reproduction with the ER.

F. An initialization system to start the Voice-based headwear detection platform; which may be manually activated by the user with voice-activation or with a physical switch, or may be remotely activated by a second person, or may be automatically activated by a system which detects when headwear is adjusted or fitted, or may be activated on a continuous or intermittent basis.

G. A system to obtain a Reference User Voice Profile (rUVP); when activated by the system in (F), the rUVP acquisition system works by the user generating some general or predefined verbal messages (e.g. a collection of phonemically balanced words, prompted by a messaging system reproduced with the ear canal receiver). Alternatively, the user may be asked to generate non-verbal sound stimuli, such as hand claps or mouth-whistles. Whilst the user creates the Reference sound message, the ASM signals are simultaneously recorded. The resulting spectral profile is the rUVP.

H. A system to obtain a Current User Voice Profile (cUVP); when activated by the system in (F), the cUVP acquisition system works by the user generating some general or predefined verbal messages (e.g. a collection of phonemically balanced words, prompted by a messaging system reproduced with the ear canal receiver). Alternatively, the user may be asked to generate non-verbal sound stimuli, such as hand claps or mouth-whistles. Whilst the user creates the Reference sound message, the ASM signals are simultaneously recorded. The resulting spectral profile is the cUVP.

I. A system to compare the rUVP and cUVP, and thus determine if headwear is used. This comparison may be in the time domain, but in an exemplary embodiment the comparison is in the frequency domain. If the frequency content of the cUVP is less than the rUVP at particular frequencies (e.g. ⅓rd octave measurements made at 1 kHz and 4 kHz) by a pre-defined amount (e.g. 5 dB), then it may be deemed that headwear is currently being worn.

Another embodiment of the invention enables the HEQS to automatically determine the frequency-dependent acoustic absorption characteristics of the headwear worn by a user (this is the Headwear acoustic Attenuation Transmission Index or ATI_HW). Once obtained, the ASM signal is filtered with a filter corresponding to the inverse of ATI_HW. This self-contained Voice-based headwear determination platform uses a Voice or non-voice (e.g. hand-clap) test sound created by the HEQS user, and is simultaneously recorded using one or more ambient sound microphones mounted on a headset near to or in the user's ear canal. The recorded sound is analyzed to determine the particular headwear and its corresponding ATI_HW using a look-up table analysis with previous measurements of known headwear. This Voice-based headwear determination platform comprises:

A. An assembly to monitor the acoustic field in a user's immediate environment using one or more Ambient Sound Microphones (ASMs) located near to or at the entrance to one or both occluded ear canals.

B. A signal processing circuit to amplify the signals from the ASMs in (A) and to equalize for the frequency sensitivity of the microphones and to low-pass filter (LPF) the signals prior to digital conversion to prevent aliasing (with the cut-off frequency of the LPF equal or less than half the sampling frequency of the digital sampling system).

C. An analog-to-digital converter (ADC) to convert the filtered analog signals in (B) to a digital representation.

D. An optional beam-forming platform that takes as its inputs the digital signals from the ASMs from one or both headsets to selectively affect the spatial sensitivity of the headset to sound in the user's local environment.

E. A digital-to-analog converter (DAC) to convert a digital audio signal into an analog audio signal for reproduction with the ER.

F. An initialization system to start the Voice-based headwear detection platform; which may be manually activated by the user with voice-activation or with a physical switch, or may be remotely activated by a second person, or may be automatically activated by a system which detects when headwear is adjusted or fitted, or may be activated on a continuous or intermittent basis.

G. A system to obtain a Reference User Voice Profile (rUVP); when activated by the system in (F), the rUVP acquisition system works by the user generating some general or predefined verbal messages (e.g. a collection of phonemically balanced words, prompted by a messaging system reproduced with the ear canal receiver). Alternatively, the user may be asked to generate non-verbal sound stimuli, such as hand claps or mouth-whistles. Whilst the user creates the Reference sound message, the ASM signals are simultaneously recorded. The resulting spectral profile is the rUVP.

H. A system to obtain a Current User Voice Profile (cUVP); when activated by the system in (F), the cUVP acquisition system works by the user generating some general or predefined verbal messages (e.g. a collection of phonemically balanced words, prompted by a messaging system reproduced with the ear canal receiver). Alternatively, the user may be asked to generate non-verbal sound stimuli, such as hand claps or mouth-whistles. Whilst the user creates the Reference sound message, the ASM signals are simultaneously recorded. The resulting spectral profile is the cUVP.

I. A system to compare the rUVP and cUVP, and to determine the particular headwear worn by the user. This comparison may be in the time domain, but in an exemplary embodiment the comparison is in the frequency domain. If the frequency content of the cUVP is less than the rUVP at particular frequencies (e.g. ⅓rd octave measurements made at 1 kHz and 4 kHz) by a pre-defined amount (e.g. 5 dB), then it may be deemed that headwear is currently being worn. The transfer function of rUVP to cUVP is compared to a database of measurements made with particular headwear with a known Headwear acoustic Attenuation Transmission Index or ATI_HW. Alternative to the ATI_HW determination system in (I), a system to empirically to determine ATI_HW which is calculated as the ratio of rUVP to cUVP.

J. A system to filter the ASM signal with a filter corresponding to the inverse of the obtained ATI_HW (i.e. obtained in process I or J). In the at least one exemplary embodiment, this filter is a digital FIR-type filter.

FIG. 7 illustrates a generic cross section of an ear canal 700, including a cartilaginous region 740 and a bony region 730 of an ear canal 720. The entrance of the ear canal 720 is referred to as the aperture 750 and defines a first end of the ear canal while the tympanic membrane 710 defines the other end of the ear canal 720. The concha 845 has a plane 760 close to the aperture 750, where the angle (A) (concha-aperture angle) between the aperture plane 750 and the concha plane 760 can vary between individuals.

FIG. 8 illustrates general outer physiology of an ear, which includes a, auricle tubercle 810, the antihelix 820, the helix 830, the antitragus 840, tragus 850, lobule of ear 860, crus of helix 870, anterior notch 880, and intertragic incisures 890.

FIG. 9 and FIG. 10 illustrates two different views 900 and 1000 of an earphone. View 900 illustrate two channels (e.g., 940 and 950) that open into the ear canal where one channel can be used for an ear canal microphone (ECM) and the other a speaker (SPKR), while the back view 1000 illustrates another port 1021 that can be used for an ambient sound microphone (ASM) to monitor the sound from the ambient environment.

FIG. 9 illustrates a front view of an earphone device 900, without an eartip that illustrates an acoustic channel 940 to an ECM connected at a port 965, an acoustic channel 950 to a SPKR 1380 connected at a port 966. The acoustic channel 950 can run from the SPKR 1380 at the connection to the port 966 to a SPKR port 981. The acoustic channel 940 can run from the ECM at the connection to the port 965 to the ECM port 931.

FIG. 10 illustrates a back of an earphone device 1000 without an eartip. The hearbud housing device 1105 of the earphone device 1000 can include acoustic channels 940 and 950 that can be connected to components of the EPH 1450, which fits inside the earphone housing 1470 of the hearbud housing device 1400 using a keyed recess 1460, for example the SPKR 1480 and ECM 1430. The cap 1460 can include a port 1421 (e.g., an ASM port) to allow sound from the ambient environment to reach the ASM 1420. The stent 940 of the hearbud housing device 1400 can be designed to help retain any tip inserted thereupon, for example, the stent 940 can include a smaller end 910 (e.g., 5.5 mm diameter) to allow ease of insertion of a tip onto the stent 940, and a thicker mid stent diameter 1011 (e.g., 6.1 mm diameter) to facilitate a tight fit after tip insertion.

Figure 11:
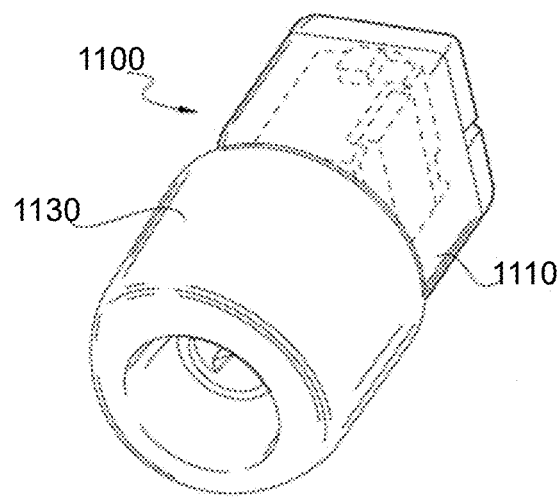
FIG. 11 and FIG. 12 illustrate two earphones each with similar housings accommodating different ear tips.
Figure 12:
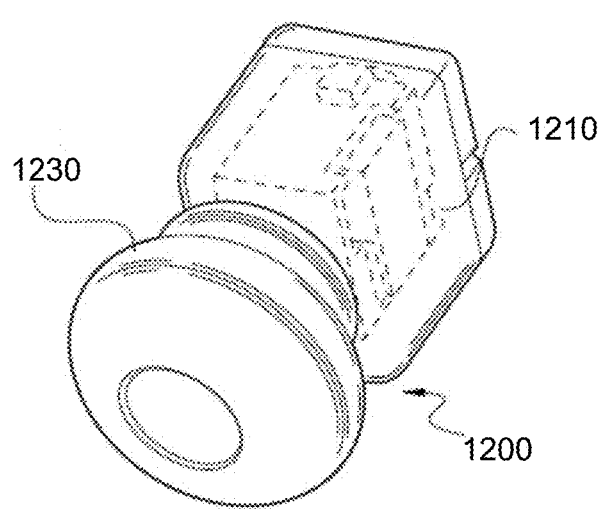

FIG. 11 and FIG. 12 illustrate two earphones 1100 and 1200 respectively. The earphone 1100 shows and earphone housing (EH) 1110 that can accommodate a commercially available eartip 1130 (e.g., Comply Tips, flange tips). The earphone housing (e.g. 1110, 1470) can additionally accommodate specialized eartips (e.g. 1230). The EH 1470 can be fabricated (e.g., molded or 3D printed) from various materials (e.g., silicone, 3D printed material, metal, wood) and any material listed herein for any part of an earphone (housing, microphone, speaker, eartips) should not be interpreted as limitative, but as examples only.

Processes, techniques, apparatus, and materials as known by one of ordinary skill in the art may not be discussed in detail but are intended to be part of the enabling description where appropriate. For example, specific materials may not be listed for achieving each of the targeted properties discussed, however one of ordinary skill would be able, without undo experimentation, to determine the materials needed given the enabling disclosure herein. For example Elastosil™ 30A, 70A, High Strength 1, 2, 3, Moldmaking Rubber (Alumilite™ products), flexible 3D printable material, silicon, urethane, rubber, however any material that can be used within the ear canal can be used for forming the shell that is inserted into the ear canal and any material that can be used for earphones (silicon, urethane, rubber, plastic, Elastosil™, metal, wood, and the like) can be used in the Housing that sits in the concha. Various material can also be printed and any other materials, as mentioned if molded.

Figure 13:
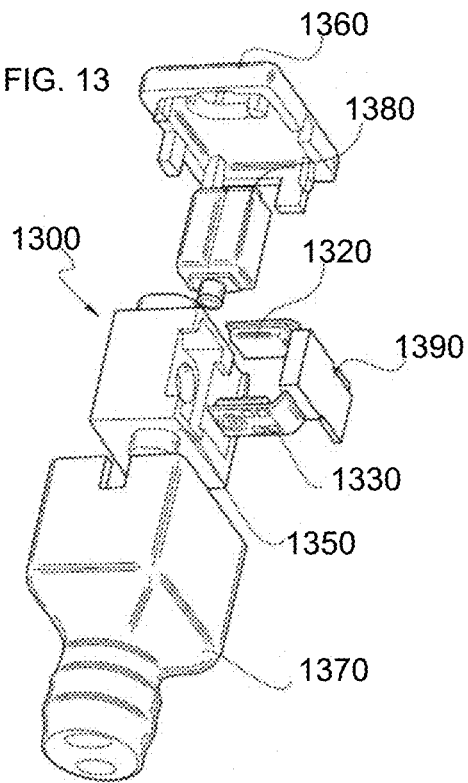
FIG. 13 and FIG. 14 illustrate exploded views of one embodiment of an earphone.

FIG. 13 illustrates an additional exploded view of a hearbud housing device 1100 with various components labelled and which are configured to be housed within the hearbud housing device 1300. For example, in certain embodiments, the components of the earphone device can include the hearbud housing device 1300, an earphone housing 1370, a cap 1360, and an electronic package housing 1350, which houses the electronics package (EP) 1390 that can include a speaker (SPKR or ECR) 1380, ambient sound microphone (ASM) 1320, an ear canal microphone (ECM) 1330, and supporting electronics that may form a part of the EP 1390. Note that any microphone that can be used in an earphone can be used for the ASM 1320 and ECM 1330. Additionally, any speaker that can be used in earphones can be used for the SPKR 1380 in the earphone device 1300.

Figure 14:
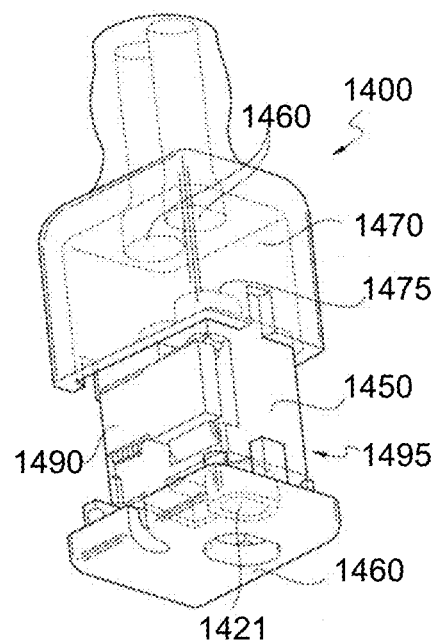

FIG. 14 illustrates how parts fit within an earphone housing 1470 of hearbud housing device 1400 of an earphone device. A set of keys 1460 (e.g., recessed or raise keys) in the earphone housing 1470 allow the earphone housing 1470 to connect with nozzles 1475 of the EPH 1450. Thus, the electronics packaging unit (EPU) 1495 can be standardized while the earphone housing 1470 design can be varied provided the keys 1460 of the earphone housing 1470 remain the same. The EPU 1495 may include the EPH 1450 that contains the EP 1490. The ASM port/nozzle 1421 connects the ambient environment to an ASM 1320 in the EPU 1495. A cap 1460 may fit over the back of the earphone housing 1470 and the back of the EPU 1495 when inserted into the earphone housing 1470 of the hearbud housing device 1400 of the earphone device.

FIG. 13 and FIG. 14 illustrate exploded views of one embodiment of an earphone (e.g. 1300 and 1400) including two microphones (e.g. 1320, 1330, e.g. Mems Digital and Analog microphones, e.g. Knowles SiSonic Microphones, model SPH0641LM4H-1, model TO-30043-000 and other microphones that can be used in earphones or phones), a speaker (e.g. 1380, e.g., Knowles model RAB-32063, model TWFK-30017-000 and other types of speakers that can be used in earphones or phones) and DSP PCB board (e.g., CSR chips, Wolfson chips, and any other DSP chip that can process audio input that can be used in earphones or phones). The earphone (e.g., 1300, 1400) includes a cap (e.g., 1360) and an earphone housing (EH) (e.g. 1370, 1470). An electronic package housing (EPH) 1450, houses the electronic parts, for example the microphones (e.g., 1320, 1330), the speakers (e.g. 1380), and the DSP PCB board. The EH 1470 and cap 1460 can change to various configuration keeping the EPH 1450 constant, facilitating testing of the EPH 1450 (with electrical components such as microphones, speakers and DSP inserted) independent of earphone configuration (e.g., shape of housing, stent 940 length).

The materials for the EPH 1450, EH 1470 and the cap 1460 can vary depending upon desired flexibility, level of hydrophobicity required, transparency, electrical isolation, RF shielding, and other properties known by one of ordinary skill in the arts of earphone design. For example, the EPH 1450, EH 1470, cap 1460 can be 3D printed for example using resins such as Formlabs™ elastic resin, tough, greypro resins or other 3D printing materials as known by one of ordinary skill in fabricating small parts with tolerances of at least 2 mm. Additionally, the parts can be molded such as with Elastosil® LR3004/30B, silicone, polyurethanes, rubber, Neoprene, or any other type of moldable material as known by one of ordinary skill in the arts of designing or fabricating earphone parts with tolerances of at least 2 mm. Additionally the parts (EPH, EH, cap) can be formed of wood metal and glass.

Figure 15:
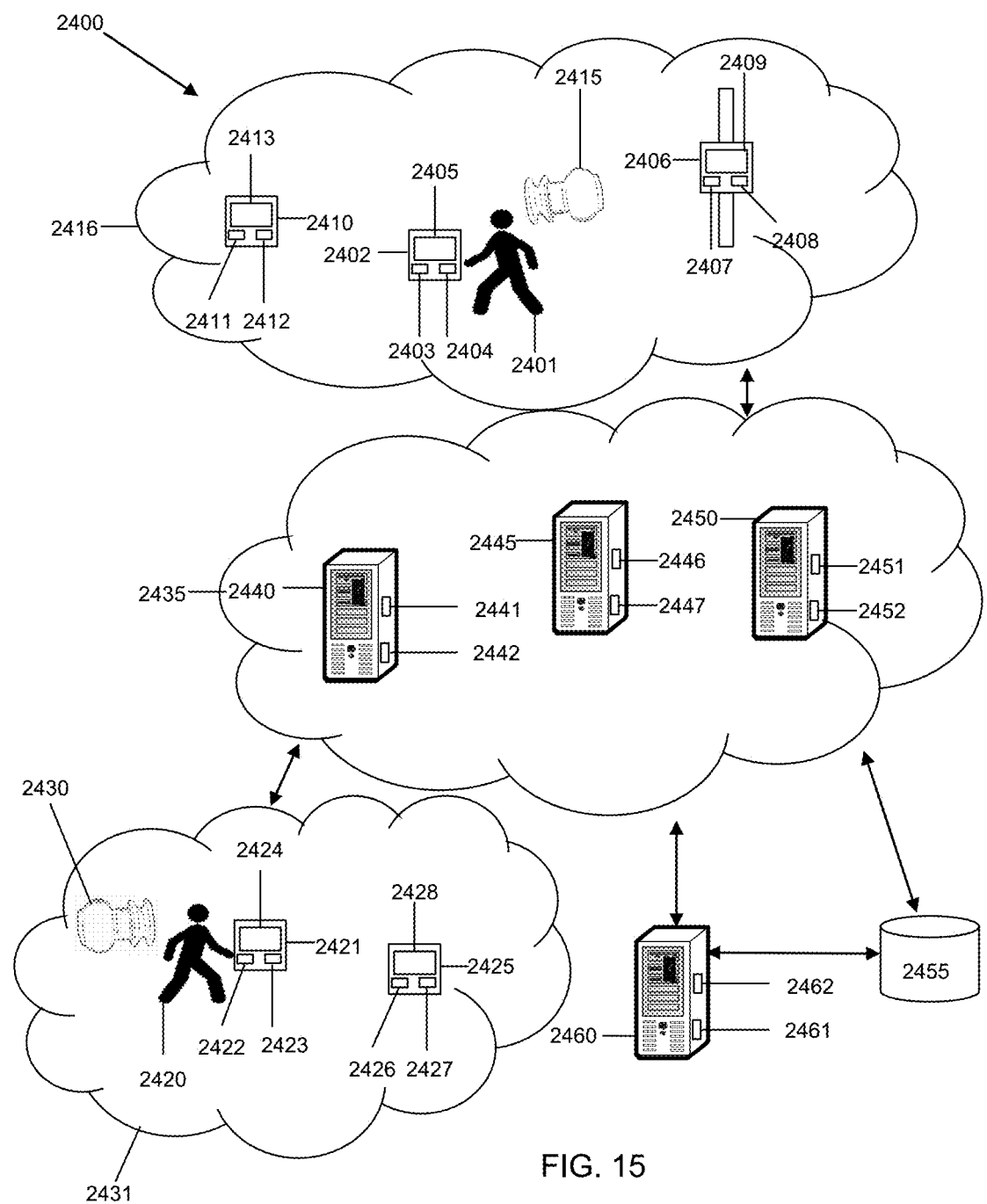
FIG. 15 is a schematic diagram of a system for utilizing earphones according to an embodiment of the present disclosure.

As shown in FIG. 15, a system 2400 and methods for utilizing eartips and/or earphone devices are disclosed.

The system 2400 may be configured to support, but is not limited to supporting, data and content services, audio processing applications and services, audio output and/or input applications and services, applications and services for transmitting and receiving audio content, authentication applications and services, computing applications and services, cloud computing services, internet services, satellite services, telephone services, software as a service (SaaS) applications, platform-as-a-service (PaaS) applications, gaming applications and services, social media applications and services, productivity applications and services, voice-over-internet protocol (VoIP) applications and services, speech-to-text translation applications and services, interactive voice applications and services, mobile applications and services, and any other computing applications and services. The system may include a first user 2401, who may utilize a first user device 2402 to access data, content, and applications, or to perform a variety of other tasks and functions. As an example, the first user 2401 may utilize first user device 2402 to access an application (e.g., a browser or a mobile application) executing on the first user device 2402 that may be utilized to access web pages, data, and content associated with the system 2400. In certain embodiments, the first user 2401 may be any type of user that may potentially desire to listen to audio content, such as from, but not limited to, a music playlist accessible via the first user device 2402, a telephone call that the first user 2401 is participating in, audio content occurring in an environment in proximity to the first user 2401, any other type of audio content, or a combination thereof. For example, the first user 2401 may be an individual that may be participating in a telephone call with another user, such as second user 2420.

The first user device 2402 utilized by the first user 2401 may include a memory 2403 that includes instructions, and a processor 2404 that executes the instructions from the memory 2403 to perform the various operations that are performed by the first user device 2402. In certain embodiments, the processor 2404 may be hardware, software, or a combination thereof. The first user device 2402 may also include an interface 2405 (e.g., screen, monitor, graphical user interface, etc.) that may enable the first user 2401 to interact with various applications executing on the first user device 2402, to interact with various applications executing within the system 2400, and to interact with the system 2400 itself. In certain embodiments, the first user device 2402 may include any number of transducers, such as, but not limited to, microphones, speakers, any type of audio-based transducer, any type of transducer, or a combination thereof. In certain embodiments, the first user device 2402 may be a computer, a laptop, a tablet device, a phablet, a server, a mobile device, a smartphone, a smart watch, and/or any other type of computing device. Illustratively, the first user device 2402 is shown as a mobile device in FIG. 15. The first user device 2402 may also include a global positioning system (GPS), which may include a GPS receiver and any other necessary components for enabling GPS functionality, accelerometers, gyroscopes, sensors, and any other componentry suitable for a mobile device.

In addition to using first user device 2402, the first user 2401 may also utilize and/or have access to a second user device 2406 and a third user device 2410. As with first user device 2402, the first user 2401 may utilize the second and third user devices 2406, 2410 to transmit signals to access various online services and content. The second user device 2406 may include a memory 2407 that includes instructions, and a processor 2408 that executes the instructions from the memory 2407 to perform the various operations that are performed by the second user device 2406. In certain embodiments, the processor 2408 may be hardware, software, or a combination thereof. The second user device 2406 may also include an interface 2409 that may enable the first user 2401 to interact with various applications executing on the second user device 2406 and to interact with the system 2400. In certain embodiments, the second user device 2406 may include any number of transducers, such as, but not limited to, microphones, speakers, any type of audio-based transducer, any type of transducer, or a combination thereof. In certain embodiments, the second user device 2406 may be and/or may include a computer, any type of sensor, a laptop, a set-top-box, a tablet device, a phablet, a server, a mobile device, a smartphone, a smart watch, and/or any other type of computing device. Illustratively, the second user device 2402 is shown as a smart watch device in FIG. 15.

The third user device 2410 may include a memory 2411 that includes instructions, and a processor 2412 that executes the instructions from the memory 2411 to perform the various operations that are performed by the third user device 2410. In certain embodiments, the processor 2412 may be hardware, software, or a combination thereof. The third user device 2410 may also include an interface 2413 that may enable the first user 2401 to interact with various applications executing on the second user device 2406 and to interact with the system 2400. In certain embodiments, the third user device 2410 may include any number of transducers, such as, but not limited to, microphones, speakers, any type of audio-based transducer, any type of transducer, or a combination thereof. In certain embodiments, the third user device 2410 may be and/or may include a computer, any type of sensor, a laptop, a set-top-box, a tablet device, a phablet, a server, a mobile device, a smartphone, a smart watch, and/or any other type of computing device. Illustratively, the third user device 2410 is shown as a smart watch device in FIG. 15.

The first, second, and/or third user devices 2402, 2406, 2410 may belong to and/or form a communications network 2416. In certain embodiments, the communications network 2416 may be a local, mesh, or other network that facilitates communications among the first, second, and/or third user devices 2402, 2406, 2410 and/or any other devices, programs, and/or networks of system 2400 or outside system 2400. In certain embodiments, the communications network 2416 may be formed between the first, second, and third user devices 2402, 2406, 2410 through the use of any type of wireless or other protocol and/or technology. For example, the first, second, and third user devices 2402, 2406, 2410 may communicate with one another in the communications network 2416, such as by utilizing Bluetooth Low Energy (BLE), classic Bluetooth, ZigBee, cellular, NFC, Wi-Fi, Z-Wave, ANT+, IEEE 802.15.4, IEEE 802.22, ISA100a, infrared, ISM band, RFID, UWB, Wireless HD, Wireless USB, any other protocol and/or wireless technology, satellite, fiber, or any combination thereof. Notably, the communications network 2416 may be configured to communicatively link with and/or communicate with any other network of the system 2400 and/or outside the system 2400.

The system 2400 may also include an earphone device 2415, which the first user 2401 may utilize to hear and/or audition audio content, transmit audio content, receive audio content, experience any type of content, process audio content, adjust audio content, store audio content, perform any type of operation with respect to audio content, or a combination thereof. The earphone device 2415 may be an earpiece, a hearing aid, an ear monitor, an ear terminal, a behind-the-ear device, any type of acoustic device, or a combination thereof. The earphone device 2415 may include any type of component utilized for any type of earpiece. In certain embodiments, the earphone device 2415 may include any number of ambient sound microphones that may be configured to capture and/or measure ambient sounds and/or audio content occurring in an environment that the earphone device 2415 is present in and/or is proximate to. In certain embodiments, the ambient sound microphones may be placed at a location or locations on the earphone device 2415 that are conducive to capturing and measuring ambient sounds occurring in the environment. For example, the ambient sound microphones may be positioned in proximity to a distal end (e.g. the end of the earphone device 2415 that is not inserted into the first user's 2401 ear) of the earphone device 2415 such that the ambient sound microphones are in an optimal position to capture ambient or other sounds occurring in the environment. In certain embodiments, the earphone device 2415 may include any number of ear canal microphones, which may be configured to capture and/or measure sounds occurring in an ear canal of the first user 2401 or other user wearing the earphone device 2415. In certain embodiments, the ear canal microphones may be positioned in proximity to a proximal end (e.g. the end of the earphone device 2415 that is inserted into the first user's 2401 ear) of the earphone device 2415 such that sounds occurring in the ear canal of the first user 2401 may be captured more readily.

The earphone device 2415 may also include any number of transceivers, which may be configured transmit signals to and/or receive signals from any of the devices in the system 2400. In certain embodiments, a transceiver of the earphone device 2415 may facilitate wireless connections and/or transmissions between the earphone device 2415 and any device in the system 2400, such as, but not limited to, the first user device 2402, the second user device 2406, the third user device 2410, the fourth user device 2421, the fifth user device 2425, the earphone device 2430, the servers 2440, 2445, 2450, 2460, and the database 2455. The earphone device 2415 may also include any number of memories for storing content and/or instructions, processors that execute the instructions from the memories to perform the operations for the earphone device 2415, and/or any type integrated circuit for facilitating the operation of the earphone device 2415. In certain embodiments, the processors may comprise, hardware, software, or a combination of hardware and software. The earphone device 2415 may also include one or more ear canal receivers, which may be speakers for outputting sound into the ear canal of the first user 2401. The ear canal receivers may output sounds obtained via the ear canal microphones, ambient sound microphones, any of the devices in the system 2400, from a storage device of the earphone device 2415, or any combination thereof.

The ear canal receivers, ear canal microphones, transceivers, memories, processors, integrated circuits, and/or ear canal receivers may be affixed to an electronics package that includes a flexible electronics board. The earphone device 2415 may include an electronics packaging housing that may house the ambient sound microphones, ear canal microphones, ear canal receivers (i.e. speakers), electronics supporting the functionality of the microphones and/or receivers, transceivers for receiving and/or transmitting signals, power sources (e.g. batteries and the like), any circuitry facilitating the operation of the earphone device 2415, or any combination thereof. The electronics package including the flexible electronics board may be housed within the electronics packaging housing to form an electronics packaging unit. The earphone device 2415 may further include an earphone housing, which may include receptacles, openings, and/or keyed recesses for connecting the earphone housing to the electronics packaging housing and/or the electronics package. For example, nozzles of the electronics packaging housing may be inserted into one or more keyed recesses of the earphone housing so as to connect and secure the earphone housing to the electronics packaging housing. When the earphone housing is connected to the electronics packaging housing, the combination of the earphone housing and the electronics packaging housing may form the earphone device 2415. The earphone device 2415 may further include a cap for securing the electronics packaging housing, the earphone housing, and the electronics package together to form the earphone device 2415.

In certain embodiments, the earphone device 2415 may be configured to have any number of changeable tips, which may be utilized to facilitate the insertion of the earphone device 2415 into an ear aperture of an ear of the first user 2401, secure the earphone device 2415 within the ear canal of an ear of the first user 2401, and/or to isolate sound within the ear canal of the first user 2401. The tips may be foam tips, which may be affixed onto an end of the earphone housing of the earphone device 2415, such as onto a stent and/or attachment mechanism of the earphone housing. In certain embodiments, the tips may be any type of eartip as disclosed and described in the present disclosure. The eartips as disclosed in the present disclosure may be configured to facilitate distributed reduced contact force, sound isolation for sound in the ear canal of the first user 2401 (i.e. between the ambient environment and the ear canal environment within an ear of the first user 2401), mold into a variety of forms and/or positions, encapsulate volumes upon insertion into an ear aperture of the first user 2401, have a pressure adjusting design, facilitate notched stent retention (i.e. on a stent of the earphone housing), facilitate stent insertion into an ear canal of the first user 2401 via an ear aperture of the first user 2401, or any combination thereof. In certain embodiments, the eartip may be designed to provide sound isolation capability that is at least as effective as conventional foam and/or flange tips. Notably, the eartips may be manufactured and configured to be made in any desired size specifications and/or materials, and may be tailored to each individual user, such as first user 2401. Additionally, an eartip according to the present disclosure may be made of a non-porous material that is not closed cell foam or open cell foam.

In certain embodiments, the eartip may be designed so that the earphone device's 2415 retention force on the ear canal walls of the first user 2401 may be distributed over a larger area than traditional foam or flange tips allow, thereby reducing the pressure on the ear canal walls of the first user 2401. Unlike foam tips, which primarily provide a restoring radial force that exerts pressure against the ear canal walls of a user, the eartip is designed to move both radially and axially, which allows for more give and redistribution of contact over a larger area, and, thus, decreases the retention pressure. As a result, this allows for increased comfort for the user and allows the user to utilize the eartip for an extended period of time when compared to traditional foam and/or flange tips. In certain embodiments, the eartip utilized with the earphone device 2415 may be configured to encapsulate a volume of gas and/or liquid. In either case (i.e. gas or liquid), the bulk of sound isolation provided by the eartip is achieved through the reflection of ambient sound waves so that the encapsulated volume can be low mass. In certain embodiments, portions of the eartip may encapsulate a volume with the ability to release volume when pressed upon without having to incorporate complicated valves. The encapsulated volume may be achieved by the ear canal wall pressing radially and/or axially against the outer surfaces of the eartip, which may force the outer portion of the eartip to seal with the inner portion of the eartip. In certain embodiments, the inner portion of the eartip may be small than the outer diameter of the stent of the earphone housing upon which the eartip is placed so that upon insertion of the eartip on the stent, the inner portion stretches outward to meet the outer surface of the eartip, which further facilitates the sealing of the ear canal of the first user 2401.

In certain embodiments, the stent of the eartip, over which the eartip is placed, may be designed to have a smaller diameter front end and a larger diameter middle section to promote retention of the eartip on the stent itself. In certain embodiments, a portion of the eartip may have an inner core diameter that is smaller than the stent outer diameter so that the eartip provides radial compression upon the stent so as to enhance sealing and to add friction to prevent axial slippage within the ear canal of the first user 2401. In certain embodiments, an increased mid-section inner core diameter of the eartip may be utilized (i.e. larger than the smaller inner core diameter of the eartip), which may be configured to line up with the mid-section outer diameter of the stent of the earphone housing of the earphone device 2415. This may provide axial stability for the earphone device 2415, while simultaneously preventing axial slippage from the ear canal of the first user 2401. In certain embodiments, the eartip may have an insertion end that has a funnel shape, which aids in inserting the eartip onto the stent of the earphone housing of the earphone device 2415.

In certain embodiments, the eartip has a configuration that applies minimal force against the first user's 2401 ear canal. Additionally, the eartip can seal the first user's 2401 ear canal by providing at least 15 dB of attenuation across frequency. To facilitate manufacturability, the eartip may be molded inverted, thereby allowing inexpensive mass production. Lips of the eartip may then be folded to contact ledges to for the eartip that may be utilized by the first user 2401. Sealing and comfort depend upon an accurate fit within the first user's 2401 ear canal, and, as a result, eartips according to the present disclosure may be manufactured in several single sizes. Notably, any of the features of any of the eartips described in the present disclosure may be combined and/or interchanged with any other eartips described in the present disclosure. Furthermore, the shape, size, features and/or functionality of any of the components of the earphone device and/or hearbud housing device described in the present disclosure may be modified for each particular user for the shape and size of each user's ear aperture and/or ear canal, or a combination thereof.

Notably, in experiments conducted using the eartip, the experiments have shown that the eartip allows for similar levels of sound isolation when compared to conventional foam and/or flange tips. For example, experiments have shown that the eartips provided in the present disclosure provided a NRR of 18 with a generally flat high frequency profile. A flat attenuation profile maintains an ambient environment's frequency profile when level reduced by the attenuation, which can be useful in maintaining the quality of ambient speech and music (or other audio content) during the level reduction process.

In further embodiments, the eartip may be configured to have an open configuration prior to insertion onto a stent of the earphone housing and/or the earphone device 2415 itself. By having an open configuration, the eartip may be mass produced using conventional molding techniques and/or by utilizing 3D commercial printers. The open configuration of the eartip also facilitates molding, and can be 3D printed, where the open configuration allows for resin removal. For example, resin removal may be achieved by utilizing commercial 3D printers that allow the use of lower durometer materials, such as Stratasys machines and the like. In certain embodiments, since the eartip has an open configuration, which is then sealed, any additional pressure can force encapsulated gas out of the eartip relieving the feedback pressure so as to keep the comfort level for the first user 2401 relatively stable.

In addition to the first user 2401, the system 2400 may include a second user 2420, who may utilize a fourth user device 2421 to access data, content, and applications, or to perform a variety of other tasks and functions. Much like the first user 2401, the second user 2420 may be may be any type of user that may potentially desire to listen to audio content, such as from, but not limited to, a storage device of the fourth user device 2421, a telephone call that the second user 2420 is participating in, audio content occurring in an environment in proximity to the second user 2420, any other type of audio content, or a combination thereof. For example, the second user 2420 may be an individual that may be listening to songs stored in a playlist that resides on the fourth user device 2421. Also, much like the first user 2401, the second user 2420 may utilize fourth user device 2421 to access an application (e.g., a browser or a mobile application) executing on the fourth user device 2421 that may be utilized to access web pages, data, and content associated with the system 2400. The fourth user device 2421 may include a memory 2422 that includes instructions, and a processor 2423 that executes the instructions from the memory 2422 to perform the various operations that are performed by the fourth user device 2421. In certain embodiments, the processor 2423 may be hardware, software, or a combination thereof. The fourth user device 2421 may also include an interface 2424 (e.g., a screen, a monitor, a graphical user interface, etc.) that may enable the second user 2420 to interact with various applications executing on the fourth user device 2421, to interact with various applications executing in the system 2400, and to interact with the system 2400. In certain embodiments, the fourth user device 2421 may include any number of transducers, such as, but not limited to, microphones, speakers, any type of audio-based transducer, any type of transducer, or a combination thereof. In certain embodiments, the fourth user device 2421 may be a computer, a laptop, a tablet device, a phablet, a server, a mobile device, a smartphone, a smart watch, and/or any other type of computing device. Illustratively, the fourth user device 2421 may be a computing device in FIG. 15. The fourth user device 2421 may also include any of the componentry described for first user device 2402, the second user device 2406, and/or the third user device 2410. In certain embodiments, the fourth user device 2421 may also include a global positioning system (GPS), which may include a GPS receiver and any other necessary components for enabling GPS functionality, accelerometers, gyroscopes, sensors, and any other componentry suitable for a computing device.

In addition to using fourth user device 2421, the second user 2420 may also utilize and/or have access to a fifth user device 2425. As with fourth user device 2421, the second user 2420 may utilize the fourth and fifth user devices 2421, 2425 to transmit signals to access various online services and content. The fifth user device 2425 may include a memory 2426 that includes instructions, and a processor 2427 that executes the instructions from the memory 2426 to perform the various operations that are performed by the fifth user device 2425. In certain embodiments, the processor 2427 may be hardware, software, or a combination thereof. The fifth user device 2425 may also include an interface 2428 that may enable the second user 2420 to interact with various applications executing on the fifth user device 2425 and to interact with the system 2400. In certain embodiments, the fifth user device 2425 may include any number of transducers, such as, but not limited to, microphones, speakers, any type of audio-based transducer, any type of transducer, or a combination thereof. In certain embodiments, the fifth user device 2425 may be and/or may include a computer, any type of sensor, a laptop, a set-top-box, a tablet device, a phablet, a server, a mobile device, a smartphone, a smart watch, and/or any other type of computing device. Illustratively, the fifth user device 2425 is shown as a tablet device in FIG. 15.

The fourth and fifth user devices 2421, 2425 may belong to and/or form a communications network 2431. In certain embodiments, the communications network 2431 may be a local, mesh, or other network that facilitates communications between the fourth and fifth user devices 2421, 2425, and/or any other devices, programs, and/or networks of system 2400 or outside system 2400. In certain embodiments, the communications network 2431 may be formed between the fourth and fifth user devices 2421, 2425 through the use of any type of wireless or other protocol and/or technology. For example, the fourth and fifth user devices 2421, 2425 may communicate with one another in the communications network 2416, such as by utilizing BLE, classic Bluetooth, ZigBee, cellular, NFC, Wi-Fi, Z-Wave, ANT+, IEEE 802.15.4, IEEE 802.22, ISA100a, infrared, ISM band, RFID, UWB, Wireless HD, Wireless USB, any other protocol and/or wireless technology, satellite, fiber, or any combination thereof. Notably, the communications network 2431 may be configured to communicatively link with and/or communicate with any other network of the system 2400 and/or outside the system 2400.

Much like first user 2401, the second user 2420 may have his or her own earphone device 2430. The earphone device 2430 may be utilized by the second user 2420 to hear and/or audition audio content, transmit audio content, receive audio content, experience any type of content, process audio content, adjust audio content, store audio content, perform any type of operation with respect to audio content, or a combination thereof. The earphone device 2430 may be an earpiece, a hearing aid, an ear monitor, an ear terminal, a behind-the-ear device, any type of acoustic device, or a combination thereof. The earphone device 2430 may include any type of component utilized for any type of earpiece, and may include any of the features, functionality and/or components described and/or usable with earphone device 2415. For example, earphone device 2430 may include any number of transceivers, ear canal microphones, ambient sound microphones, processors, memories, housings, eartips, foam tips, flanges, any other component, or any combination thereof.

In certain embodiments, the first, second, third, fourth, and/or fifth user devices 2402, 2406, 2410, 2421, 2425 and/or earphone devices 2415, 2430 may have any number of software applications and/or application services stored and/or accessible thereon. For example, the first and second user devices 2402, 2411 may include applications for processing audio content, applications for playing, editing, transmitting, and/or receiving audio content, streaming media applications, speech-to-text translation applications, cloud-based applications, search engine applications, natural language processing applications, database applications, algorithmic applications, phone-based applications, product-ordering applications, business applications, e-commerce applications, media streaming applications, content-based applications, database applications, gaming applications, internet-based applications, browser applications, mobile applications, service-based applications, productivity applications, video applications, music applications, social media applications, presentation applications, any other type of applications, any types of application services, or a combination thereof. In certain embodiments, the software applications and services may include one or more graphical user interfaces so as to enable the first and second users 2401, 2420 to readily interact with the software applications. The software applications and services may also be utilized by the first and second users 2401, 2420 to interact with any device in the system 2400, any network in the system 2400 (e.g. communications networks 2416, 2431, 2435), or any combination thereof. For example, the software applications executing on the first, second, third, fourth, and/or fifth user devices 2402, 2406, 2410, 2421, 2425 and/or earphone devices 2415, 2430 may be applications for receiving data, applications for storing data, applications for auditioning, editing, storing and/or processing audio content, applications for receiving demographic and preference information, applications for transforming data, applications for executing mathematical algorithms, applications for generating and transmitting electronic messages, applications for generating and transmitting various types of content, any other type of applications, or a combination thereof. In certain embodiments, the first, second, third, fourth, and/or fifth user devices 2402, 2406, 2410, 2421, 2425 and/or earphone devices 2415, 2430 may include associated telephone numbers, internet protocol addresses, device identities, or any other identifiers to uniquely identify the first, second, third, fourth, and/or fifth user devices 2402, 2406, 2410, 2421, 2425 and/or earphone devices 2415, 2430 and/or the first and second users 2401, 2420. In certain embodiments, location information corresponding to the first, second, third, fourth, and/or fifth user devices 2402, 2406, 2410, 2421, 2425 and/or earphone devices 2415, 2430 may be obtained based on the internet protocol addresses, by receiving a signal from the first, second, third, fourth, and/or fifth user devices 2402, 2406, 2410, 2421, 2425 and/or earphone devices 2415, 2430 or based on profile information corresponding to the first, second, third, fourth, and/or fifth user devices 2402, 2406, 2410, 2421, 2425 and/or earphone devices 2415, 2430.

The system 2400 may also include a communications network 2435. The communications network 2435 may be under the control of a service provider, the first and/or second users 2401, 2420, any other designated user, or a combination thereof. The communications network 2435 of the system 2400 may be configured to link each of the devices in the system 2400 to one another. For example, the communications network 2435 may be utilized by the first user device 2402 to connect with other devices within or outside communications network 2435. Additionally, the communications network 2435 may be configured to transmit, generate, and receive any information and data traversing the system 2400. In certain embodiments, the communications network 2435 may include any number of servers, databases, or other componentry. The communications network 2435 may also include and be connected to a mesh network, a local network, a cloud-computing network, an IMS network, a VoIP network, a security network, a VoLTE network, a wireless network, an Ethernet network, a satellite network, a broadband network, a cellular network, a private network, a cable network, the Internet, an internet protocol network, MPLS network, a content distribution network, any network, or any combination thereof. Illustratively, servers 2440, 2445, and 2450 are shown as being included within communications network 2435. In certain embodiments, the communications network 2435 may be part of a single autonomous system that is located in a particular geographic region or be part of multiple autonomous systems that span several geographic regions.

Notably, the functionality of the system 2400 may be supported and executed by using any combination of the servers 2440, 2445, 2450, and 2460. The servers 2440, 2445, and 2450 may reside in communications network 2435, however, in certain embodiments, the servers 2440, 2445, 2450 may reside outside communications network 2435. The servers 2440, 2445, and 2450 may provide and serve as a server service that performs the various operations and functions provided by the system 2400. In certain embodiments, the server 2440 may include a memory 2441 that includes instructions, and a processor 2442 that executes the instructions from the memory 2441 to perform various operations that are performed by the server 2440. The processor 2442 may be hardware, software, or a combination thereof. Similarly, the server 2445 may include a memory 2446 that includes instructions, and a processor 2447 that executes the instructions from the memory 2446 to perform the various operations that are performed by the server 2445. Furthermore, the server 2450 may include a memory 2451 that includes instructions, and a processor 2452 that executes the instructions from the memory 2451 to perform the various operations that are performed by the server 2450. In certain embodiments, the servers 2440, 2445, 2450, and 2460 may be network servers, routers, gateways, switches, media distribution hubs, signal transfer points, service control points, service switching points, firewalls, routers, edge devices, nodes, computers, mobile devices, or any other suitable computing device, or any combination thereof. In certain embodiments, the servers 2440, 2445, 2450 may be communicatively linked to the communications network 2435, the communications network 2416, the communications network 2431, any network, any device in the system 2400, any program in the system 2400, or any combination thereof.

The database 2455 of the system 2400 may be utilized to store and relay information that traverses the system 2400, cache content that traverses the system 2400, store data about each of the devices in the system 2400 and perform any other typical functions of a database. In certain embodiments, the database 2455 may be connected to or reside within the communications network 2435, the communications network 2416, the communications network 2431, any other network, or a combination thereof. In certain embodiments, the database 2455 may serve as a central repository for any information associated with any of the devices and information associated with the system 2400. Furthermore, the database 2455 may include a processor and memory or be connected to a processor and memory to perform the various operation associated with the database 2455. In certain embodiments, the database 2455 may be connected to the earphone devices 2415, 2430, the servers 2440, 2445, 2450, 2460, the first user device 2402, the second user device 2406, the third user device 2410, the fourth user device 2421, the fifth user device 2425, any devices in the system 2400, any other device, any network, or any combination thereof.

The database 2455 may also store information and metadata obtained from the system 2400, store metadata and other information associated with the first and second users 2401, 2420, store user profiles associated with the first and second users 2401, 2420, store device profiles associated with any device in the system 2400, store communications traversing the system 2400, store user preferences, store information associated with any device or signal in the system 2400, store information relating to patterns of usage relating to the first, second, third, fourth, and fifth user devices 2402, 2406, 2410, 2421, 2425, store audio content associated with the first, second, third, fourth, and fifth user devices 2402, 2406, 2410, 2421, 2425 and/or earphone devices 2415, 2430, store audio content and/or information associated with the audio content that is captured by the ambient sound microphones, store audio content and/or information associated with audio content that is captured by ear canal microphones, store any information obtained from any of the networks in the system 2400, store audio content and/or information associated with audio content that is outputted by ear canal receivers of the system 2400, store any information and/or signals transmitted and/or received by transceivers of the system 2400, store any device and/or capability specifications relating to the earphone devices 2415, 2430, store historical data associated with the first and second users 2401, 2415, store information relating to the size (e.g. depth, height, width, curvatures, etc.) and/or shape of the first and/or second user's 2401, 2420 ear canals and/or ears, store information identifying and or describing any eartip utilized with the earphone devices 2401, 2415, store device characteristics for any of the devices in the system 2400, store information relating to any devices associated with the first and second users 2401, 2420, store any information associated with the earphone devices 2415, 2430, store log on sequences and/or authentication information for accessing any of the devices of the system 2400, store information associated with the communications networks 2416, 2431, store any information generated and/or processed by the system 2400, store any of the information disclosed for any of the operations and functions disclosed for the system 2400 herewith, store any information traversing the system 2400, or any combination thereof. Furthermore, the database 2455 may be configured to process queries sent to it by any device in the system 2400.

The system 2400 may also include a software application, which may be configured to perform and support the operative functions of the system 2400, such as the operative functions of the first, second, third, fourth, and fifth user devices 2402, 2406, 2410, 2421, 2425 and/or the earphone devices 2415, 2430. In certain embodiments, the application may be a website, a mobile application, a software application, or a combination thereof, which may be made accessible to users utilizing one or more computing devices, such as the first, second, third, fourth, and fifth user devices 2402, 2406, 2410, 2421, 2425 and/or the earphone devices 2415, 2430. The application of the system 2400 may be accessible via an internet connection established with a browser program or other application executing on the first, second, third, fourth, and fifth user devices 2402, 2406, 2410, 2421, 2425 and/or the earphone devices 2415, 2430, a mobile application executing on the first, second, third, fourth, and fifth user devices 2402, 2406, 2410, 2421, 2425 and/or the earphone devices 2415, 2430, or through other suitable means. Additionally, the application may allow users and computing devices to create accounts with the application and sign-in to the created accounts with authenticating username and password log-in combinations. The application may include a custom graphical user interface that the first user 2401 or second user 2420 may interact with by utilizing a browser executing on the first, second, third, fourth, and fifth user devices 2402, 2406, 2410, 2421, 2425 and/or the earphone devices 2415, 2430. In certain embodiments, the software application may execute directly as an installed program on the first, second, third, fourth, and fifth user devices 2402, 2406, 2410, 2421, 2425 and/or the earphone devices 2415, 2430.

Computing System for Facilitating the Operation and Functionality of the System

Figure 16:
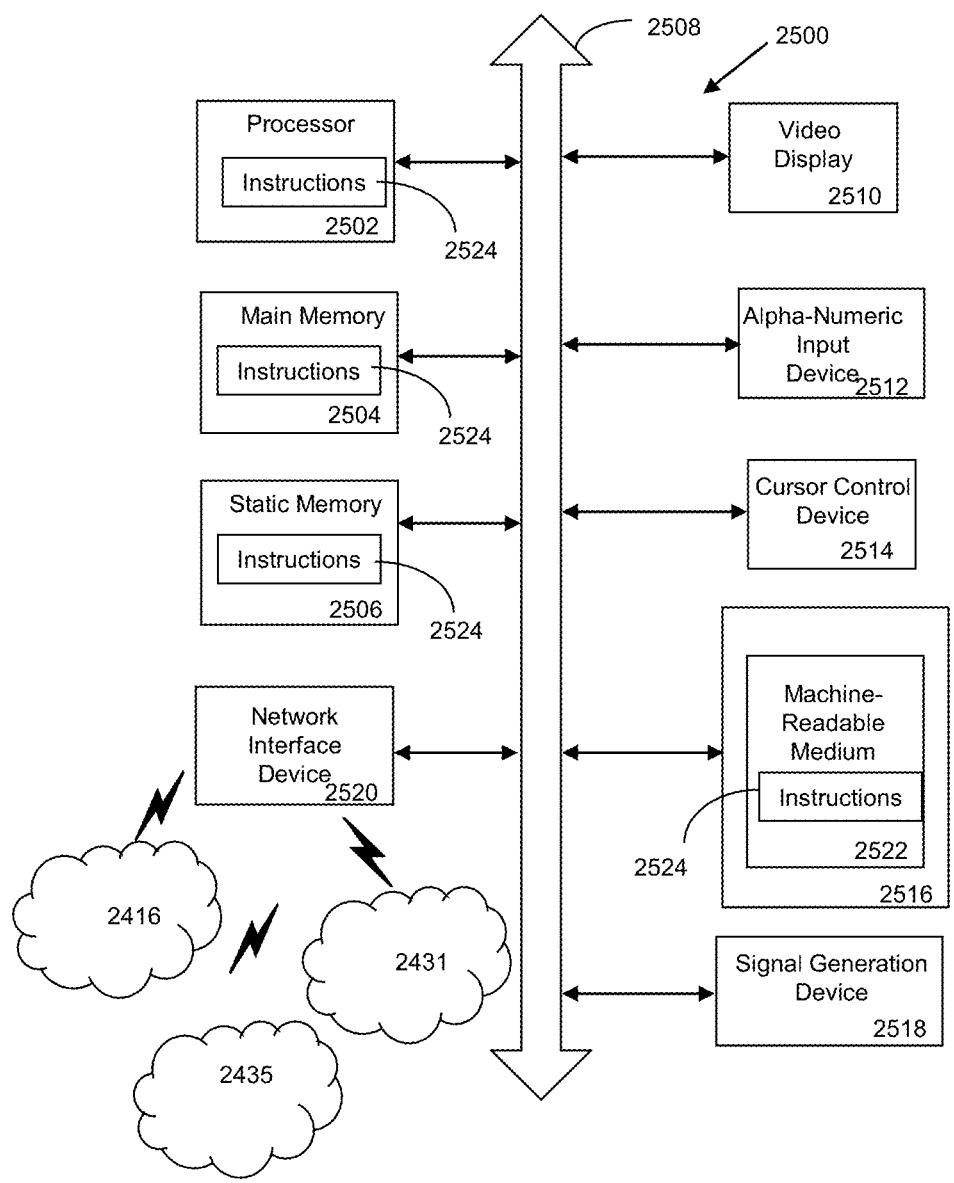
FIG. 16 is a schematic diagram of a machine in the form of a computer system which a set of instructions, when executed, may cause the machine to perform any one or more of the methodologies or operations of the systems and methods for utilizing an earphone according to embodiments of the present disclosure.

Referring now also to FIG. 16, at least a portion of the methodologies and techniques described with respect to the exemplary embodiments of the system 2400 can incorporate a machine, such as, but not limited to, computer system 2500, or other computing device within which a set of instructions, when executed, may cause the machine to perform any one or more of the methodologies or functions discussed above. The machine may be configured to facilitate various operations conducted by the system 2400. For example, the machine may be configured to, but is not limited to, assist the system 2400 by providing processing power to assist with processing loads experienced in the system 2400, by providing storage capacity for storing instructions or data traversing the system 2400, by providing functionality and/or programs for facilitating the operative functionality of the earphone devices 2415, 2430, and/or the first, second, third, fourth, and fifth user devices 2402, 2406, 2410, 2421, 2425 and/or the earphone devices 2415, 2430, by providing functionality and/or programs for facilitating operation of any of the components of the earphone devices 2415, 2430 (e.g. ear canal receivers, transceivers, ear canal microphones, ambient sound microphones, or by assisting with any other operations conducted by or within the system 2400.

In some embodiments, the machine may operate as a standalone device. In some embodiments, the machine may be connected (e.g., using communications network 2435, the communications network 2416, the communications network 2431, another network, or a combination thereof) to and assist with operations performed by other machines and systems, such as, but not limited to, the first user device 2402, the second user device 2411, the third user device 2410, the fourth user device 2421, the fifth user device 2425, the earphone device 2415, the earphone device 2430, the server 2440, the server 2450, the database 2455, the server 2460, or any combination thereof. The machine may be connected with any component in the system 2400. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 2500 may include a processor 2502 (e.g., a central processing unit (CPU), a graphics processing unit (GPU), a main memory 2504 and a static memory 2506, which communicate with each other via a bus 2508. The computer system 2500 may further include a video display unit 2510, which may be, but is not limited to, a liquid crystal display (LCD), a flat panel, a solid state display, or a cathode ray tube (CRT). The computer system 2500 may include an input device 2512, such as, but not limited to, a keyboard, a cursor control device 2514, such as, but not limited to, a mouse, a disk drive unit 2516, a signal generation device 2518, such as, but not limited to, a speaker or remote control, and a network interface device 2520.

The disk drive unit 2516 may include a machine-readable medium 2522 on which is stored one or more sets of instructions 2524, such as, but not limited to, software embodying any one or more of the methodologies or functions described herein, including those methods illustrated above. The instructions 2524 may also reside, completely or at least partially, within the main memory 2504, the static memory 2506, or within the processor 2502, or a combination thereof, during execution thereof by the computer system 2500. The main memory 2504 and the processor 2502 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 2522 containing instructions 2524 so that a device connected to the communications network 2435, the communications network 2416, the communications network 2431, another network, or a combination thereof, can send or receive voice, video or data, and communicate over the communications network 2435, the communications network 2416, the communications network 2431, another network, or a combination thereof, using the instructions. The instructions 2524 may further be transmitted or received over the communications network 2435, another network, or a combination thereof, via the network interface device 2520.

While the machine-readable medium 2522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device," or "computer-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

Figure 17:
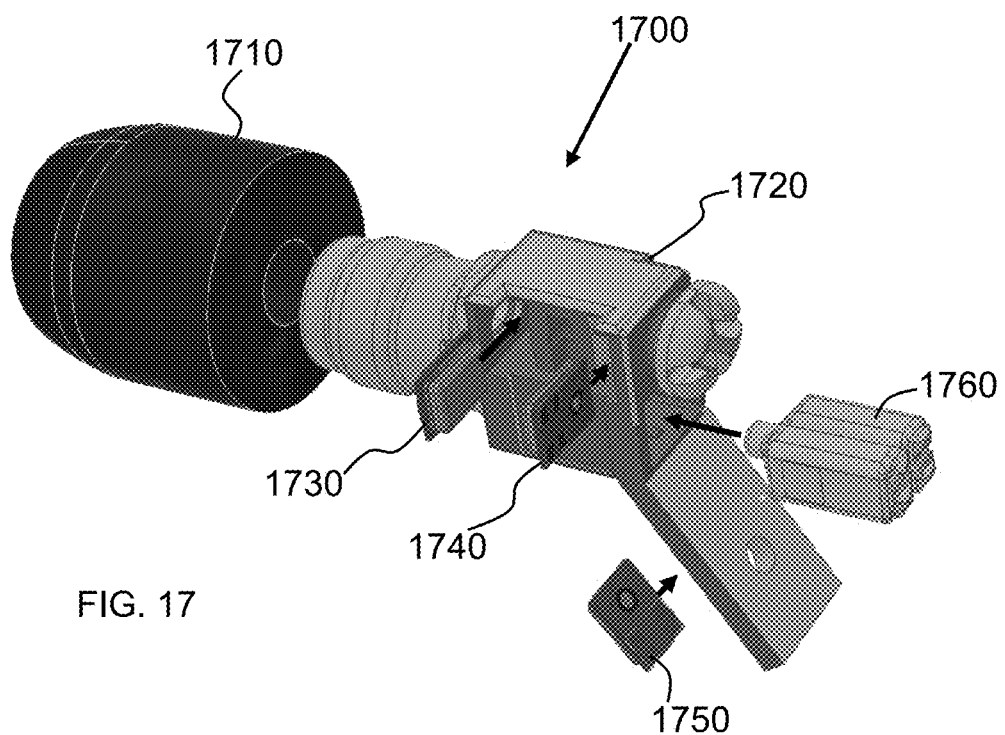
FIG. 17 is a schematic exploded view of a multimicrophone earphone.
Figure 18:
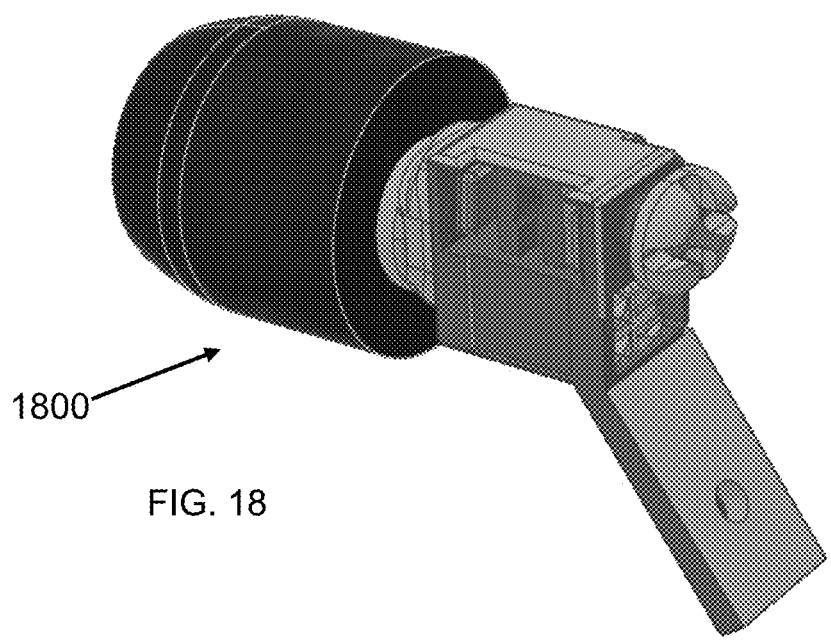
FIG. 18 illustrates the earphone of FIG. 17 with components inserted.

FIG. 17 is a schematic exploded view of a multimicrophone earphone 1700. The earphone 1700 can include an eartip 1710, an electronic package housing 1720, a first microphone 1730 (e.g., an ECM), a second microphone 1740 (e.g., a first ASM), a third microphone 1740 (e.g. a second ASM), and a speaker 1760, where FIG. 18 illustrates the earphone of FIG. 17 with components inserted.

Figure 19:
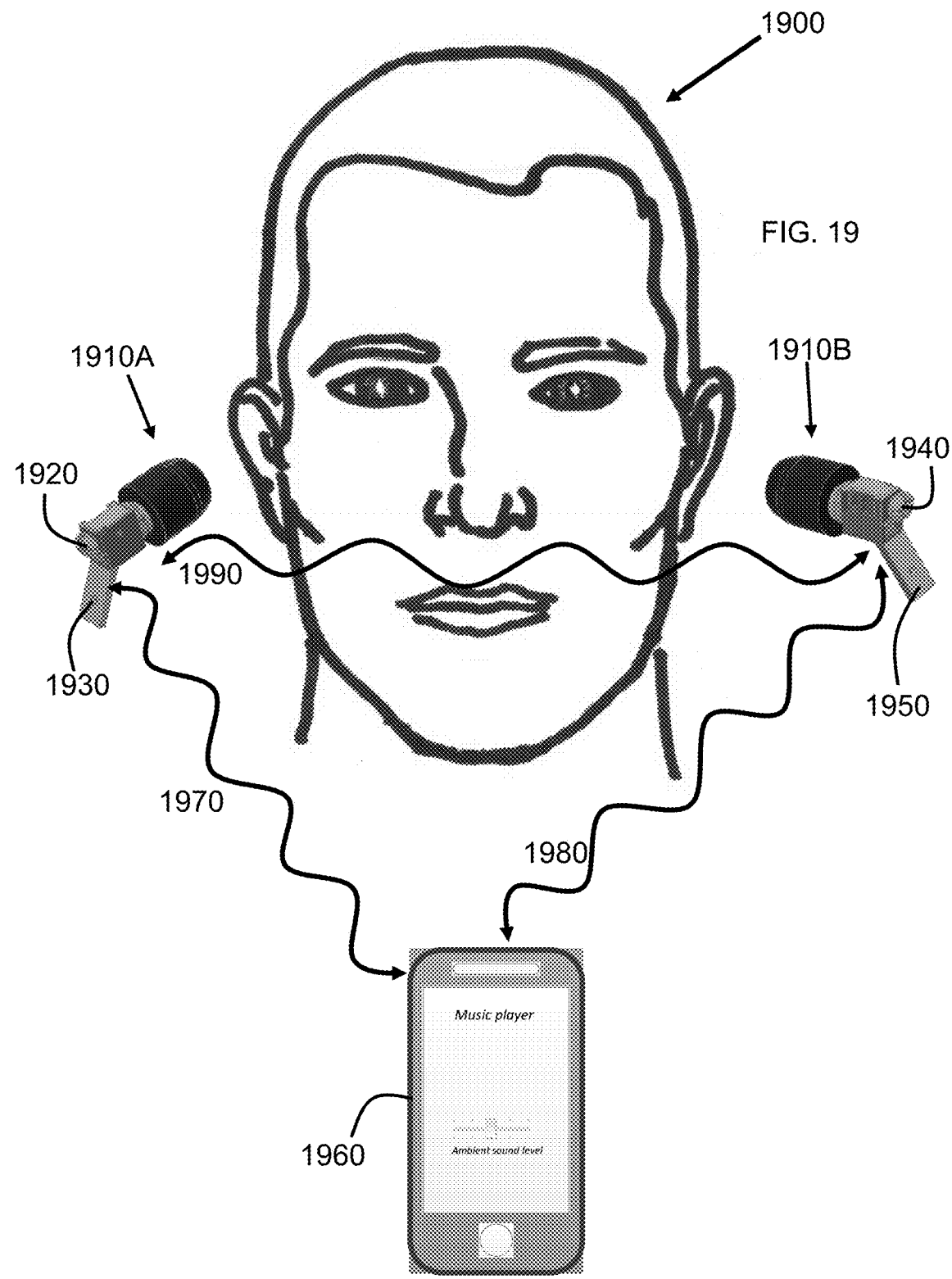
FIG. 19 illustrates left and right earphones prior to insertion of a user's ears.

FIG. 19 illustrates left 1910A and right earphones 1910B prior to insertion of a user's ears. The Earphones can have a total of at least four ASMs (1920, 1930, 1940, and 1950), which can be used in accordance with the description herein for example beam forming and voice detection and/or identification. For example, FIG. 2B illustrates the use of three ASMs. Two of these can be in earphone 1910A while the remainder is in earphone 1910B or vice versa. Additionally, all four or more can be used. FIG. 19 additionally shows a communication device which can include an ASM. Thus, each earphone (1910A, 1910B) can each contribute an ASM and the communication device 1970 the third ASM or all ASMs of communicatively coupled (e.g, 1970, 1980, 1990) devices (earphones, communication device 1960 (e.g., phone, ipad, computer) can be used.

Figure 20:
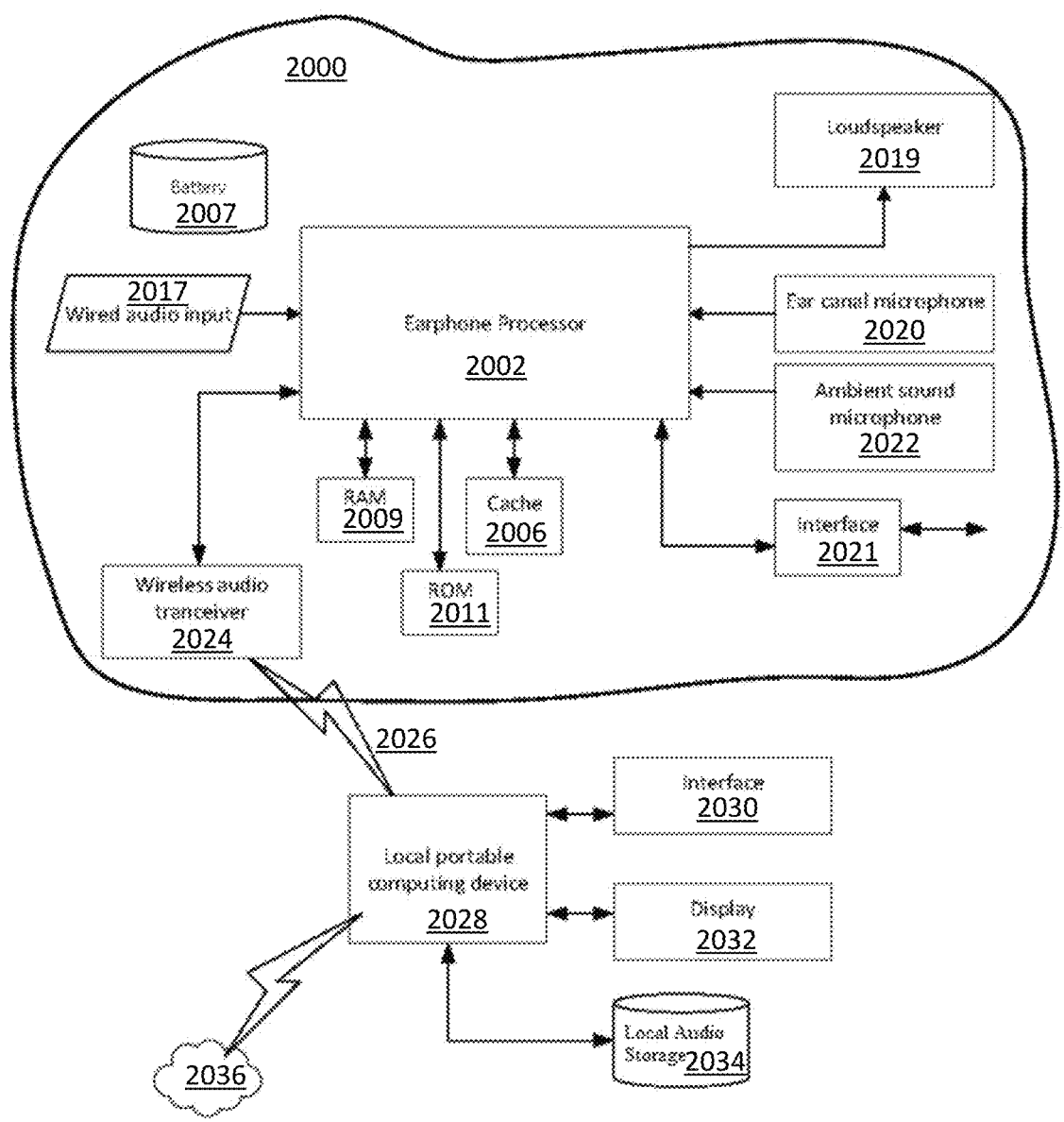
FIG. 20 illustrates the internal circuitry of an earphone.

FIG. 20 is a block diagram of an electronic earphone device suitable for use with at least one of the described embodiments. The electronic device 2000 illustrates circuitry of a representative computing device. The electronic device 2000 includes a processor 2002 that pertains to a Digital Signal Processor (DSP) device or microprocessor or controller for controlling the overall operation of the electronic device 2000. For example, processor 2002 can be used to receive a wireless 2024 or wired 2017 audio input signals. The electronic device 2000 can also include a cache 2006. The cache 2006 is, for example, Random Access Memory (RAM) provided by semiconductor memory. The relative access time to the cache 2006 is substantially shorter than for the system RAM 2009.

The electronic device 2000 is powered by a battery 2007. The electronic device 2000 (e.g., earphone) can also include the RAM 2009 and a Read-Only Memory (ROM) 2011. The ROM 2011 can store programs, utilities or processes to be executed in a non-volatile manner.

The speaker 2019 is an ear canal loudspeaker, also often referred to as a receiver. Microphone 2020 can be used to detect audible sound in the ear canal (ear canal microphone).

A second microphone 2022 can be used to detect audible sound in the ambient environment (ambient sound microphone).

An optional interface 2021 on the earphone device 2000 can be used for user input, such as a capacitive touch sensor.

A wireless audio and data transceiver unit 2024 connects with a computing device 2028 (e.g., a local portable computing device). The wireless connection 2026 can be any electromagnetic connection, for example via Bluetooth or Wifi or magnetic induction, and transmits audio and control data. The local portable computing device 2028 can be a mobile phone, tablet, television, gaming hardware unit or other similar hardware devices.

The local portable computing device 2028 utilizes a user interface 2030 and display 2032, such as a touch screen or buttons, and can be connected to the cloud 2036 to receive and stream audio. Alternatively, audio can be replayed to the earphone device 2000 from storage 2034 on the computing device 2028.

Exemplary embodiments are directed to or can be operatively used on various passive eartips for hearing protection or electronic wired or wireless earpiece devices (e.g., hearing aids, ear monitors, headphones, ear terminal, behind the ear devices or other acoustic devices as known by one of ordinary skill, and equivalents). For example, the earpieces can have one or more transducers (e.g. ambient sound microphone (ASM), ear canal microphone (ECM), ear canal receiver (ECR/SPKR)) for monitoring/providing sound. In all the examples illustrated and discussed herein, any specific values should be interpreted to be illustrative only and non-limiting. Thus, other examples of the exemplary embodiments could have different values.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions of the relevant exemplary embodiments. Thus, the description of the invention is merely exemplary in nature and, thus, variations that do not depart from the gist of the invention are intended to be within the scope of the exemplary embodiments of the present invention. Such variations are not to be regarded as a departure from the spirit and scope of the present invention.

What is claimed:

1. An earbud comprising:
a first Ambient Sound Microphone (ASM), wherein the first ASM generates a first ASM signal;
a second ASM, wherein the second ASM generates a second ASM signal;
an ear canal microphone (ECM), wherein the ECM generates an ECM signal;
a speaker;
a memory that is configured to store instructions; and
a processor that executes the instructions to perform operations, wherein the processor is coupled to the first ASM, wherein the processor is coupled to the second ASM, wherein the processor is coupled to the ECM, wherein the processor is coupled to the speaker, and the operations comprising:
receiving the first ASM signal;
receiving the second ASM signal;
receiving the ECM signal;
generating a first signal from at least one of the first ASM signal, or the second ASM signal, or both;
generating an ambient sound signal from the first signal or a modified first signal;
detecting if the user is speaking by analyzing at least one of the first signal, or the first ASM signal, or the second ASM signal, or the ECM signal, or by analyzing the first signal and the ECM signal; and
adjusting at least one of the ambient sound signal, an audio content signal, a mixed ambient sound signal and audio content signal, a noise signal or a combination thereof, when it is detected that the user is speaking.

2. The earbud according to claim 1 wherein the operation of adjusting, adjusts the audio content signal by reducing its volume.

3. The earbud according to claim 2 wherein the operation of adjusting also amplifies the ambient sound signal.

4. The earbud according to claim 1 wherein the operation of adjusting, adjusts the ambient sound signal by increasing its volume.

5. The earbud according to claim 1 wherein the operations further comprise:
If the user speaking is detected, analyzing at least one of the first ASM signal, the second ASM signal, the ECM signal, or a combination thereof to detect a voice command.

6. The earbud according to claim 3 wherein the operations further comprise:
resetting the volume of the ambient sound signal to a preset value when a preset time increment has expired.

7. The earbud according to claim 4 wherein the operations further comprise:
resetting the volume of the ambient sound signal to a preset value when a preset time increment has expired.

8. The earbud according to claim 3 wherein the operations further comprise:
resetting the volume of the audio content signal to a preset value when a preset time increment has expired.

9. The earbud according to claim 1 wherein the operations further comprise:
determining the background noise level by analyzing at least one of the first ASM signal, the second ASM signal, the ECM signal, or a combination thereof.

10. The earbud according to claim 1 wherein the operations further comprise:
determining the background noise level by analyzing at least one of a modified first ASM signal, a modified second ASM signal, modified ECM signal, or a combination thereof.

11. The earbud according to claim 9, wherein the operations further comprise:
generating an anti-noise signal using at least one of the first ASM signal, the second ASM signal, the ECM signal or a combination thereof.

12. The earbud according to claim 10, wherein the operations further comprise:
generating an anti-noise signal using at least one of the modified first ASM signal, the modified second ASM signal, the modified ECM signal or a combination thereof.

13. The earbud according to claim 11, wherein the operations further comprise:
mixing the ambient sound signal and audio content signal to generate a mixed signal.

14. The earbud according to claim 13, wherein the operations further comprise:
generating a new mixed signal by combining the mixed signal with the anti-noise signal.

15. The earbud according to claim 14, wherein the operations further comprise:
reducing the anti-noise signal and increasing the ambient sound signal prior to mixing if the user's voice is detected.

16. The earbud according to claim 12, wherein the operations further comprise:
mixing the ambient sound signal and audio content signal to generate a mixed signal.

17. The earbud according to claim 16, wherein the operations further comprise:
generating a new mixed signal by combining the mixed signal with the anti-noise signal.

18. The earbud according to claim 17, wherein the operations further comprise:
reducing the anti-noise signal and increasing the ambient sound signal prior to mixing if the user's voice is detected.

19. An earbud comprising:
a first Ambient Sound Microphone (ASM), wherein the first ASM generates a first ASM signal;
a second ASM, wherein the second ASM generates a second ASM signal;
an ear canal microphone (ECM), wherein the ECM generates an ECM signal;
a speaker;
a memory that is configured to store instructions; and
a processor that is coupled to the first ASM, wherein the processor is coupled to the second ASM, wherein the processor is coupled to the ECM, wherein the processor is coupled to the speaker, wherein the processor receives the first ASM signal, wherein the processor receives the second ASM signal, wherein the processor receives the ECM signal, wherein the processor generates a first signal from at least one of the first ASM signal, or the second ASM signal, or both, wherein the processor generates an ambient sound signal from the first signal or a modified first signal, wherein the processor detects if a user is speaking by analyzing at least one of the first signal, or the first ASM signal, or the second ASM signal, or the ECM signal, or by analyzing the first signal and the ECM signal, and adjusts a level of the ambient sound signal sent to the speaker if the user's voice is detected.

20. The earbud according to claim 19, wherein an audio content sent to the speaker is adjusted if the user's voice is detected.

21. A method comprising:
receiving the first ASM signal from a first ambient sound microphone;
receiving the second ASM signal from a second ambient sound microphone;
receiving the ECM signal from an ear canal microphone;
generating a first signal from at least one of the first ASM signal, or the second ASM signal, or both;
generating an ambient sound signal from the first signal or a modified first signal;
detecting if the user is speaking by analyzing at least one of the first signal, or the first ASM signal and the second ASM signal, or the first ASM signal and the ECM signal, or the second ASM signal and the ECM signal; and
adjusting a mixed signal sent to the speaker, wherein the mixed signal is a combination of the ambient sound signal, the audio content signal, and an anti-noise signal, when it is detected that the user is speaking.

22. The method according to claim 21 further comprising:
adjusting the mixed signal by reducing a volume of the audio content signal.

23. The method according to claim 21 further comprising:
adjusting the mixed signal by increasing a volume of the ambient sound signal.

24. The method according to 31 further comprising:
analyzing at least one of the first ASM signal, the second ASM signal, the ECM signal, or a combination thereof to detect a voice command.

25. The method according to claim 23 further comprising:
resetting the volume of the ambient sound signal to a preset value when a preset time increment has expired.

26. The method according to claim 22 further comprising:
resetting the volume of the audio content signal to a preset value when a preset time increment has expired.

27. The method according to claim 21 further comprising:
generating a background noise level by analyzing at least one of the first ASM signal, the second ASM signal, the ECM signal, or a combination thereof.

28. The method according to claim 21 further comprising:
generating a background noise level by analyzing at least one of a modified first ASM signal, a modified second ASM signal, a modified ECM signal, or a combination thereof.

29. The method according to claim 21 further comprising:
generating the anti-noise signal using at least one of the first ASM signal, the second ASM signal, the ECM signal or a combination thereof.

30. The method according to claim 21 further comprising:
generating the anti-noise signal using at least one of the modified first ASM signal, the modified second ASM signal, the modified ECM signal or a combination thereof.

* * * * *

UNITED STATES PATENT AND TRADEMARK OFFICE
CERTIFICATE OF CORRECTION

| | |
|---|---|
| PATENT NO. | : 11,750,965 B2 |
| APPLICATION NO. | : 17/353810 |
| DATED | : September 5, 2023 |
| INVENTOR(S) | : John Usher, Steve Goldstein and John P. Keady |

Page 1 of 1

It is certified that error appears in the above-identified patent and that said Letters Patent is hereby corrected as shown below:

In the Claims

Column 32, Line 23 Claim 24:
claim 31
Should be:
claim 21

Signed and Sealed this
Twenty-fifth Day of March, 2025

Coke Morgan Stewart
*Acting Director of the United States Patent and Trademark Office*